(12) United States Patent
Iwata et al.

(10) Patent No.: US 9,242,285 B2
(45) Date of Patent: Jan. 26, 2016

(54) MANUFACTURING DEVICE FOR DRIVE PLATE AND MANUFACTURING METHOD FOR DRIVE PLATE

(75) Inventors: Daisuke Iwata, Nishio (JP); Tomoyuki Hori, Anjo (JP); Naoki Yokoyama, Nishio (JP); Hiroshi Shibata, Takahama (JP); Masayuki Maki, Nisshin (JP)

(73) Assignee: AISIN AW CO., LTD., Anjo (JP)

( * ) Notice: Subject to any disclaimer, the term of this patent is extended or adjusted under 35 U.S.C. 154(b) by 268 days.

(21) Appl. No.: 14/001,769

(22) PCT Filed: Oct. 24, 2011

(86) PCT No.: PCT/JP2011/074440
§ 371 (c)(1),
(2), (4) Date: Aug. 27, 2013

(87) PCT Pub. No.: WO2012/127725
PCT Pub. Date: Sep. 27, 2012

(65) Prior Publication Data
US 2014/0000334 A1  Jan. 2, 2014

(30) Foreign Application Priority Data

Mar. 24, 2011 (JP) ................................. 2011-066337
Mar. 24, 2011 (JP) ................................. 2011-066340

(51) Int. Cl.
*B21D 53/28* (2006.01)
*B21D 37/10* (2006.01)
(Continued)

(52) U.S. Cl.
CPC ............... *B21D 22/02* (2013.01); *B21D 37/10* (2013.01); *B21D 53/28* (2013.01); *B21K 1/30* (2013.01);
(Continued)

(58) Field of Classification Search
CPC ........ B21D 22/02; B21D 37/10; B21D 53/28; B21K 1/30; F16H 55/17; Y10T 29/49474; Y10T 74/1987
See application file for complete search history.

(56) References Cited

U.S. PATENT DOCUMENTS 4,381,910 A  5/1983  Matsumoto et al.
4,876,876 A  10/1989  Ishida et al.
(Continued)

FOREIGN PATENT DOCUMENTS

EP  2 666 561 A1  11/2013
JP  S-59-042144 A  3/1984
(Continued)

OTHER PUBLICATIONS

International Search Report issued in International Patent Application No. PCT/JP2011/074449 dated Nov. 29, 2011 (with translation).
(Continued)

*Primary Examiner* — Alexander P Taousakis
(74) *Attorney, Agent, or Firm* — Oliff PLC

(57) ABSTRACT

A manufacturing method and device for a drive plate that make it possible to obtain well-tensioned teeth at a ring gear portion while extending the life of a shaping die. A preferred embodiment provides a manufacturing device including: a compression punch that compresses a side wall portion of a raw material in an axial direction, the raw material including a bottom surface portion and the side wall portion which is cylindrical and provided to extend upright from an outer peripheral end portion of the bottom surface portion. A compression die disposed to face the compression punch in the axial direction and having a toothed shape formed on an inner peripheral surface. The compression punch contacts the compression die, and thereafter the compression die is pushed by the compression punch to form a toothed shape on the side wall portion while moving in the axial direction.

9 Claims, 41 Drawing Sheets

(51) Int. Cl.
*B21K 1/30* (2006.01)
*F16H 55/17* (2006.01)
*B21D 22/02* (2006.01)

(52) U.S. Cl.
CPC ........... *F16H 55/17* (2013.01); *Y10T 29/49472* (2015.01); *Y10T 29/49474* (2015.01); *Y10T 29/49476* (2015.01); *Y10T 29/49478* (2015.01); *Y10T 74/1987* (2015.01)

(56) References Cited

U.S. PATENT DOCUMENTS

| | | | |
|---|---|---|---|
| 5,237,744 | A | 8/1993 | Himmeroeder |
| 5,310,432 | A | 5/1994 | Fukui et al. |
| 5,927,121 | A | 7/1999 | Rolf et al. |
| 6,016,602 | A | 1/2000 | Kanemitsu et al. |
| 6,233,999 | B1 | 5/2001 | Yabutani et al. |
| 6,959,576 | B2 | 11/2005 | Hastings et al. |
| 7,337,647 | B2 * | 3/2008 | Shimomura et al. ............ 72/359 |
| 7,350,391 | B2 | 4/2008 | Takagi |
| 2004/0231447 | A1 | 11/2004 | Kimura |
| 2005/0278952 | A1 | 12/2005 | Ooka |
| 2006/0016075 | A1 * | 1/2006 | Oki et al. ................... 29/893.34 |
| 2007/0234570 | A1 | 10/2007 | Wang |
| 2011/0126654 | A1 | 6/2011 | Lev et al. |
| 2012/0240405 | A1 | 9/2012 | Iwata et al. |
| 2012/0297910 | A1 | 11/2012 | Iwata et al. |
| 2013/0081439 | A1 | 4/2013 | Nakashima et al. |
| 2014/0000334 | A1 | 1/2014 | Iwata et al. |

FOREIGN PATENT DOCUMENTS

| | | |
|---|---|---|
| JP | H-01-317653 A | 12/1989 |
| JP | A-04-009243 | 1/1992 |
| JP | H-04-22520 A | 1/1992 |
| JP | H-01-127921 A | 4/1992 |
| JP | H05 293586 A | 11/1993 |
| JP | H-07-256377 | 9/1995 |
| JP | H-08-276238 A | 10/1996 |
| JP | B2-2885266 | 4/1999 |
| JP | A-2008-212983 | 9/2008 |
| JP | A-2005-264837 | 11/2008 |
| WO | WO 2004/094083 A2 | 11/2004 |

OTHER PUBLICATIONS

Jul. 14, 2014 Extended European Search Report issued in Application No. 11 86 1657.2.
Jul. 15, 2014 Extended European Search Report issued in Application No. 11 86 1508.7.
U.S. Appl. No. 13/985,404, filed Aug. 14, 2013 in the name of Iwata et al.
International Search Report issued in International Application No. PCT/JP2011/074440 dated Nov. 29, 2011 (with translation).

* cited by examiner

F I G . 16
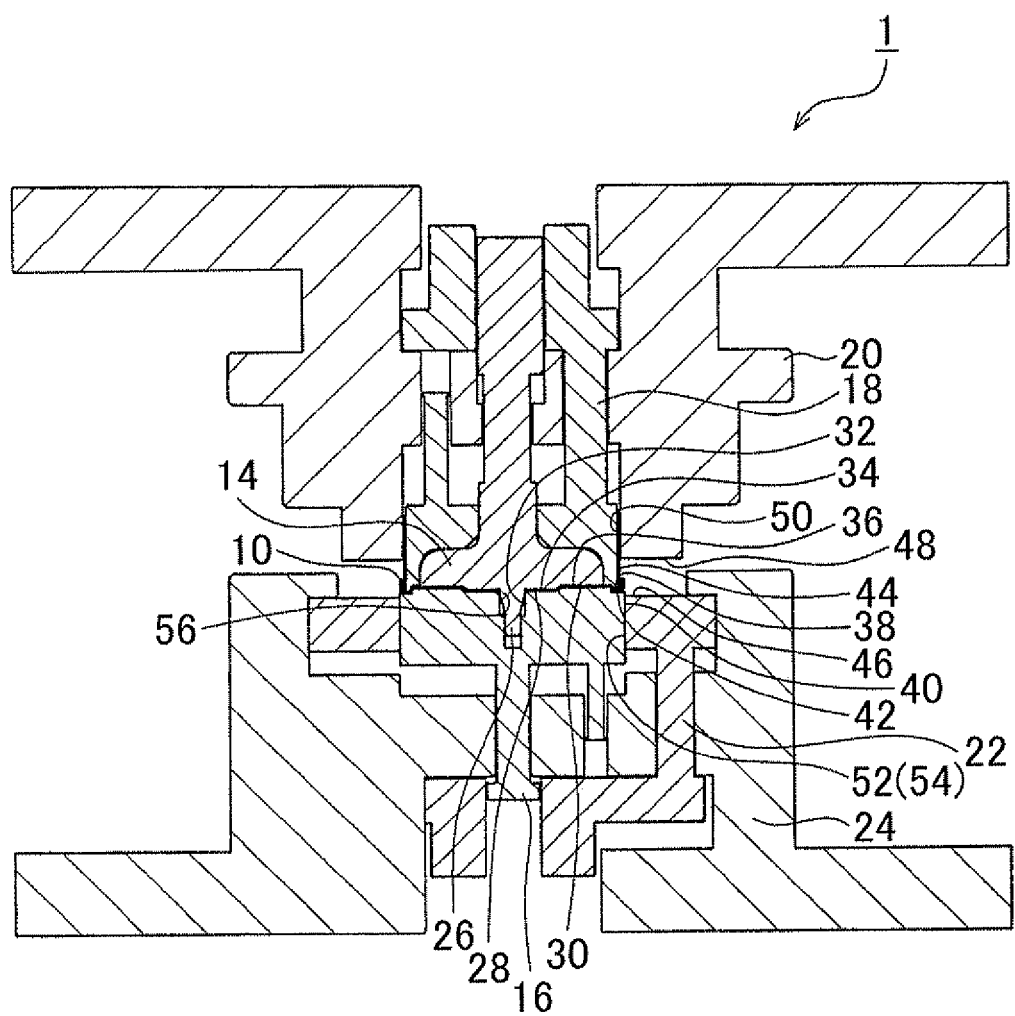

F I G . 41
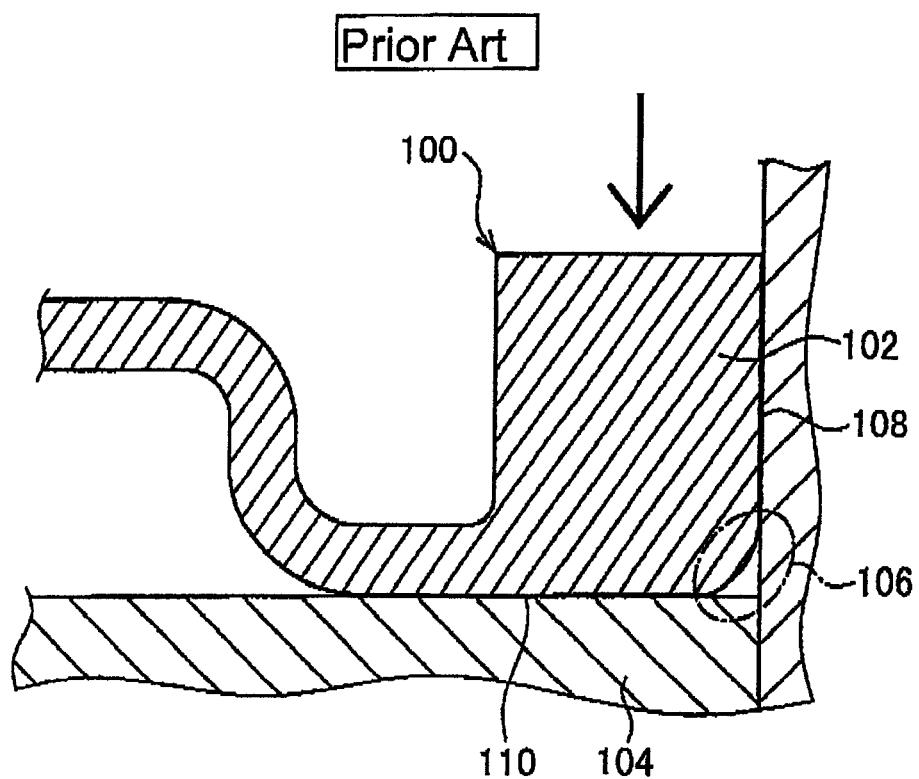

MANUFACTURING DEVICE FOR DRIVE PLATE AND MANUFACTURING METHOD FOR DRIVE PLATE

INCORPORATION BY REFERENCE

The disclosure of Japanese Patent Application No. 2011-066340 filed on Mar. 24, 2011, Japanese Patent Application No. 2011-066337 filed on Mar. 24, 2011 including the specification, drawings and abstract is incorporated herein by reference in its entirety.

BACKGROUND OF THE INVENTION

The present invention relates to a manufacturing device for a drive plate that transfers a drive force of an engine to a torque converter of a transmission, and to a manufacturing method for such a drive plate.

DESCRIPTION OF THE RELATED ART

Japanese Patent No. 2885266 describes a manufacturing method for a drive plate including forming a sheet metal raw material into a cup-shaped raw material, and forming teeth on a cylindrical portion of the cup-shaped raw material while increasing the thickness of the cylindrical portion by compressing the cylindrical portion in the axial direction.

SUMMARY OF THE INVENTION

In the manufacturing method for a drive plate disclosed in Japanese Patent No. 2885266, however, the cylindrical portion of the cup-shaped raw material is disposed between a compression punch (forging punch), a pressure receiving member, and a die, and the cylindrical portion is compressed in the axial direction by the compression punch with the die stationary. In the case where the cylindrical portion of the cup-shaped raw material is compressed by the compression punch in this way, the cylindrical portion is first bulged from its axially center portion to tightly contact the die. Then, when the cylindrical portion of the cup-shaped raw material is further compressed by the compression punch, the material at the axially center portion of the cylindrical portion of the cup-shaped raw material stays where it is because of the frictional force between the die and the material because the die is stationary. Therefore, the cylindrical portion of the cup-shaped raw material is subjected to a small pressure on the side of the pressure receiving member, while the cylindrical portion is subjected to a large pressure applied by the compression punch on the side of the compression punch.

Thus, the corner portion at which a surface of the pressure receiving member on the side of the raw material and the inner peripheral surface of the die crosses is not filled with the material of the cylindrical portion of the cup-shaped raw material, and an underfill portion 106 is formed at a portion of a cylindrical portion 102 of a cup-shaped raw material 100 on the side of a pressure receiving member 104 as shown in FIG. 41. Here, the cylindrical portion 102 of the raw material 100 corresponds to a ring gear portion provided at the outer peripheral portion of a manufactured drive plate. Therefore, once the underfill portion 106 is formed as described above, well-tensioned teeth may not be obtained at the ring gear portion of the drive plate.

Here, the phrase "well-tensioned teeth may not be obtained" means that the corner portion of the toothed portion (the boundary portion between the tooth tip surface and the side surface) of the ring gear portion of the drive plate may not be well-tensioned. In the raw material 100 shown in FIG. 41, a right surface 108 corresponds to the tooth tip surface of the ring gear portion, and a lower surface 110 corresponds to the side surface of the ring gear portion.

Here, the surface 110 of the cylindrical portion 102 of the cup-shaped raw material 100 on the side of the pressure receiving member 104 serves as a surface of the ring gear portion of the drive plate into which a gear of a starter motor enters when the ring gear portion is meshed with the gear of the starter motor when the drive plate is assembled to an automobile. Therefore, the ring gear portion may not be smoothly meshed with the gear of the starter motor if well-tensioned teeth may not be obtained on the surface 110 of the cylindrical portion 102 of the cup-shaped raw material 100 on the side of the pressure receiving member 104. Thus, it is conceivable to obtain well-tensioned teeth by enhancing the load for compression by the compression punch. However, enhancing the load for compression may reduce the life of a shaping die such as the compression punch.

The present invention has been made to address the foregoing issues, and therefore has an object to provide a manufacturing device for a drive plate and a manufacturing method for a drive plate that make it possible to obtain well-tensioned teeth at a ring gear portion while extending the life of a shaping die.

In order to address the foregoing issues, an aspect of the present invention provides a manufacturing device for a drive plate that manufactures a drive plate including a plate portion that transfers a drive force of an engine to a transmission and a ring gear portion provided at an outer periphery of the plate portion to be meshed with a gear of a starter motor, the manufacturing device for a drive plate being characterized by including: a compression punch that compresses a side wall portion of a raw material in an axial direction, the raw material including a bottom surface portion and the side wall portion which is cylindrical and provided to extend upright from an outer peripheral end portion of the bottom surface portion; a compression die disposed to face the compression punch in the axial direction and having a toothed shape formed on an inner peripheral surface of the compression die; and a die that restrains the bottom surface portion, in which when the compression punch compresses the side wall portion, which is disposed inward of the inner peripheral surface of the compression die, in the axial direction, the compression punch contacts the compression die, and thereafter the compression die is pushed by the compression punch to form a toothed shape on the side wall portion while both the compression die and the compression punch are relatively moving in the axial direction with respect to the die that restrains the bottom surface portion to form the ring gear portion.

According to the aspect, after the side wall portion of the raw material is bulged to tightly contact the compression die, the material of the side wall portion is dragged in the moving direction of the compression die by the frictional resistance between the side wall portion and the compression die. Therefore, the pressure acting on a portion of the side wall portion on the leading side in the moving direction of the compression punch becomes higher. Thus, well-tensioned teeth can be obtained on a surface of the thickened side wall portion on the leading side in the moving direction of the compression punch.

In addition, well-tensioned teeth can be obtained even if the side wall portion of the raw material is not compressed by the compression punch with a large load, thereby extending the life of the compression punch.

In the aspect described above, preferably, an outside diameter of the compression punch is may be larger than a root diameter of the toothed shape formed on the inner peripheral surface of the compression die.

According to the aspect, increasing the outside dimension of the compression punch can thicken the compression punch. This increases the strength of the compression punch, thereby extending the life of the compression punch.

The manufacturing device for a drive plate according to the aspect described above may further include a restraint punch that restrains the bottom surface portion of the raw material from a side in which the side wall portion extends upright in the axial direction at a location inward of the side wall portion, and the side wall portion may have been formed with a toothed shape in advance so as to include a small-diameter portion formed on an inner side in a radial direction and a large-diameter portion formed on an outer side in the radial direction with respect to the small-diameter portion, and the large-diameter portion of the side wall portion may be spaced from an outer peripheral surface of the restraint punch when the compression punch starts compressing the side wall portion in the axial direction.

According to the aspect, the restraint punch which restrains the bottom surface portion of the raw material from the side which the side wall portion extends upright in the axial direction is provided at a location inward of the side wall portion. In addition, the side wall portion of the raw material has been formed with a toothed shape in advance so as to include the small-diameter portion formed on the inner side in the radial direction and the large-diameter portion formed on the outer side in the radial direction with respect to the small-diameter portion. Moreover, the large-diameter portion of the side wall portion of the raw material is spaced from the outer peripheral surface of the restraint punch when the compression punch starts compressing the side wall portion of the raw material in the axial direction. In this way, at least a radially inner portion of the large-diameter portion of the side wall portion of the raw material is not restrained when the compression punch starts compressing the side wall portion of the raw material in the axial direction. Consequently, as the compression punch compresses the side wall portion of the raw material in the axial direction, the material of the side wall portion of the raw material flows at least radially inward. Therefore, the thickness of the ring gear portion (side wall portion) of the drive plate can be increased. This improves the strength of the drive plate.

In the aspect described above, the outer peripheral surface of the restraint punch may be a smooth surface having generally the same diameter over the entire periphery.

According to the aspect, the outer peripheral surface of the restraint punch is a smooth surface having generally the same diameter over the entire periphery. Therefore, the strength of the restraint punch is improved compared to a case where the restraint punch is a punch in which a toothed shape is formed on the outer peripheral surface. This extends the life of the compression punch. This also reduces the cost of the compression punch.

In order to address the foregoing issues, another aspect of the present invention provides a manufacturing method for a drive plate for manufacturing a drive plate including a plate portion that transfers a drive force of an engine to a transmission and a ring gear portion provided at an outer periphery of the plate portion to be meshed with a gear of a starter motor. The manufacturing method for a drive plate includes a compression process in which a compression punch configured to compress a side wall portion of a raw material in an axial direction compresses the side wall portion of the raw material in the axial direction, the raw material including a bottom surface portion and the side wall portion which is cylindrical and provided to extend upright from an outer peripheral end portion of the bottom surface portion, in which in the compression process, the side wall portion is disposed inward of an inner peripheral surface of a compression die disposed to face the compression punch in the axial direction and having a toothed shape formed on the inner peripheral surface, the compression punch contacts the compression die, and thereafter the compression die is pushed by the compression punch to form a toothed shape on the side wall portion while both the compression die and the compression punch are relatively moving in the axial direction with respect to the die that restrains the bottom surface portion to form the ring gear portion.

With the manufacturing device for a drive plate and the manufacturing method for a drive plate according to the present invention, it is possible to obtain well-tensioned teeth at a ring gear portion while extending the life of a shaping die.

BRIEF DESCRIPTION OF THE DRAWINGS

FIG. 16 shows the overall configuration of the manufacturing device for the drive plate in a workpiece restraint process;

FIG. 41 shows how an underfill portion is formed in a manufacturing method for a drive plate disclosed in Patent Document 1.

DETAILED DESCRIPTION OF THE EMBODIMENTS

Embodiments of the present invention will be described in detail below with reference to the accompanying drawings.

First Embodiment

In the embodiment, first, a workpiece which is a flat disk-shaped raw material is processed to manufacture a cup-shaped workpiece. Next, the cup-shaped workpiece is processed to manufacture a drive plate.

<Manufacture of Cup-Shaped Workpiece>

[Configuration of Manufacturing Device]

First, the configuration of a manufacturing device 101 for a cup-shaped workpiece that manufactures a cup-shaped workpiece will be described. The manufacturing device 101 processes a workpiece 10 which is a flat disk-shaped raw material to manufacture a cup-shaped workpiece 10 (see FIG. 12).

Figure 1:
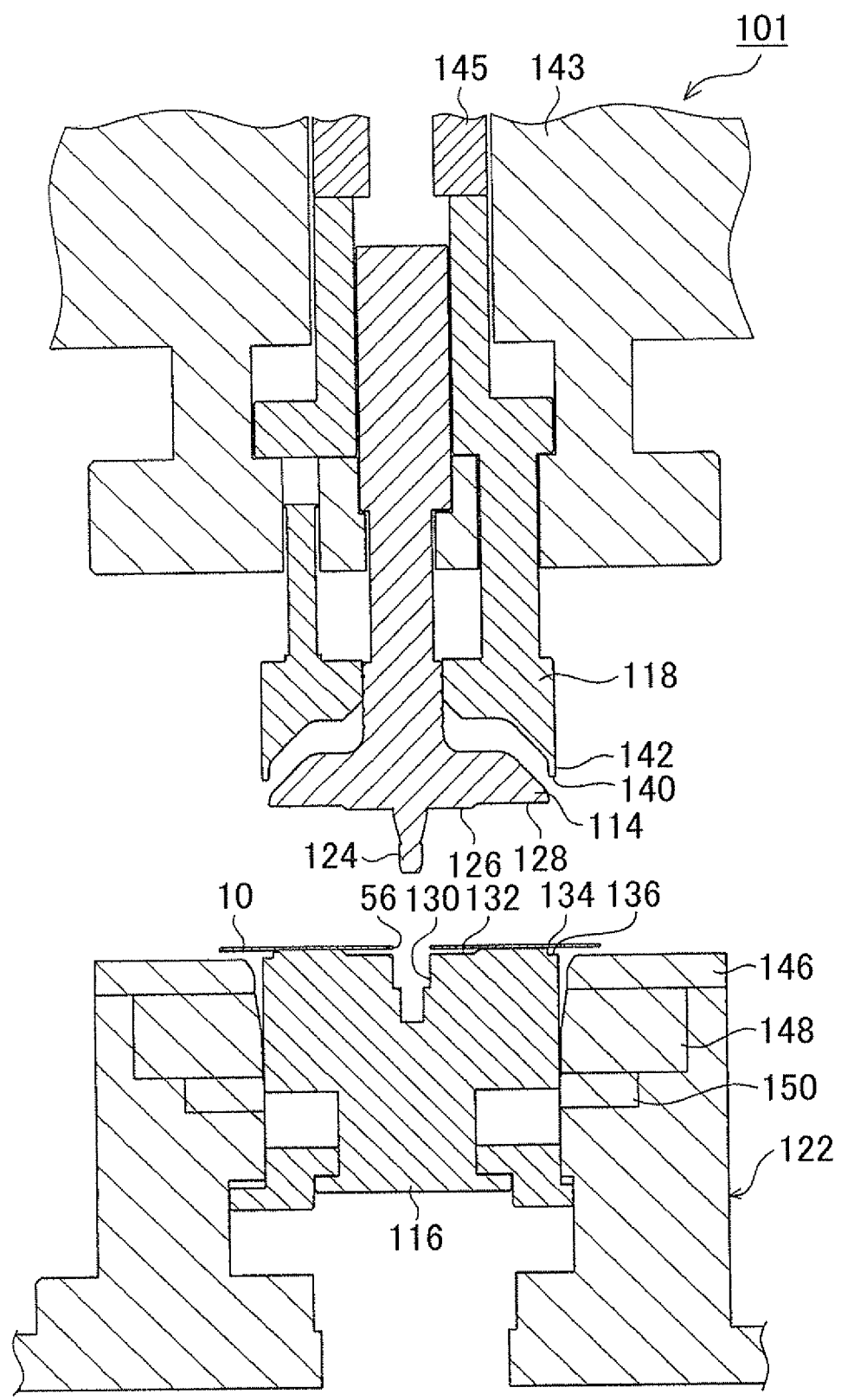
FIG. 1 shows the overall configuration of a manufacturing device for a cup-shaped workpiece.

FIG. 1 shows the overall configuration of the manufacturing device 101 for a cup-shaped workpiece. FIG. 1 shows a state in a workpiece placement process to be discussed later. As shown in FIG. 1, the manufacturing device 101 includes a first restraint punch 114, a second restraint punch 116, a toothed punch 118, and a die portion 122.

The first restraint punch 114 is disposed at a position at which it faces the second restraint punch 116 (at a position in the upper direction of FIG. 1). A surface of the first restraint punch 114 facing the second restraint punch 116 is formed to have a circular outer shape. The surface of the first restraint punch 114 includes a projecting portion 124, a first distal-end surface 126, a second distal-end surface 128, and so forth.

The projecting portion 124 is provided at the center portion of the surface of the first restraint punch 114 facing the second restraint punch 116, and shaped to project on the side of the second restraint punch 116 (on the lower side of FIG. 1) with respect to the first distal-end surface 126 and the second distal-end surface 128. The first distal-end surface 126 is provided on the outer peripheral side of the first restraint punch 114 (on the left-right side of FIG. 1) with respect to the projecting portion 124. The second distal-end surface 128 is provided on the outer peripheral side of the first restraint punch 114 (on the left-right side of FIG. 1) with respect to the first distal-end surface 126. The first distal-end surface 126 is provided on the side of the second restraint punch 116 (on the lower side of FIG. 1) with respect to the second distal-end surface 128.

The second restraint punch 116 is disposed at a position at which it faces the first restraint punch 114 (at a position in the lower direction of FIG. 1). A surface of the second restraint punch 116 facing the first restraint punch 114 is formed to have a circular outer shape. The surface of the second restraint punch 116 includes a recessed portion 130, a first distal-end surface 132, a second distal-end surface 134, an outer periphery facing surface 136, and so forth.

The recessed portion 130 is provided at the center portion of the surface of the second restraint punch 116 facing the first restraint punch 114, and shaped to be recessed on the side opposite the side of the first restraint punch 114 (on the lower side of FIG. 1) with respect to the first distal-end surface 132 and the second distal-end surface 134. The first distal-end surface 132 is provided on the outer peripheral side of the second restraint punch 116 (on the left-right side of FIG. 1) with respect to the recessed portion 130. The second distal-end surface 134 is provided on the outer peripheral side of the second restraint punch 116 with respect to the first distal-end surface 132. The outer periphery facing surface 136 is provided on the outer peripheral side of the second restraint punch 116 with respect to the second distal-end surface 134. The second distal-end surface 134 is provided on the side of the first restraint punch 114 (on the upper side of FIG. 1) with respect to the first distal-end surface 132 and the outer periphery facing surface 136.

The toothed punch 118 is disposed outward of the first restraint punch 114. The toothed punch 118 is provided with a distal-end surface 140 facing the second restraint punch 116. The distal-end surface 140 is provided along the shape of the outer periphery of the toothed punch 118, and provided at a position at which it faces the outer periphery facing surface 136 of the second restraint punch 116. An outer peripheral surface 142 provided to extend upright from an outer peripheral end portion of the distal-end surface 140 of the toothed punch 118 is formed in a toothed shape in order to form teeth in a preliminary side wall portion 64 (see FIG. 13) together with a reduced-diameter tooth shaping die 148 to be discussed later.

In addition, the manufacturing device 101 includes a double-action pressing mechanism including a first slide shaft 143 and a second slide shaft 145. As shown in FIG. 1, the second slide shaft 145 is disposed inside the first slide shaft 143. The toothed punch 118 is driven by ascending and descending drive of the second slide shaft 145 to be moved in the up-down direction of FIG. 1. The first slide shaft 143 is driven to be ascended and descended by a first slide shaft drive mechanism (not shown; a mechanism driven by a drive source such as a motor or a hydraulic device). The second slide shaft 145 is driven to be ascended and descended by a second slide shaft drive mechanism (not shown; a mechanism driven by a drive source such as a motor or a hydraulic device).

Figure 2:
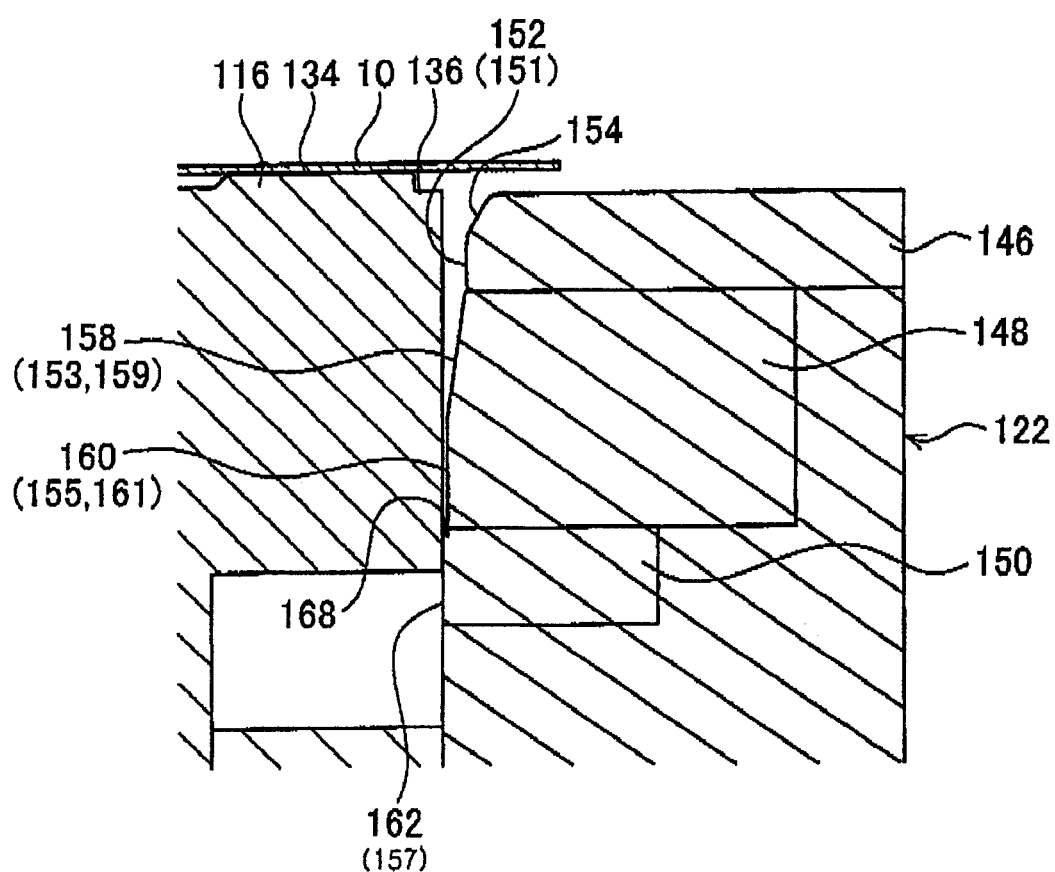
FIG. 2 is an enlarged view showing a main portion around dies.

The die portion 122 is formed by a drawing die 146, the reduced-diameter tooth shaping die 148, a backing plate 150, and so forth. The drawing die 146, the reduced-diameter tooth shaping die 148, and the backing plate 150 are sequentially arranged in this order in the direction in which the toothed punch 118, the first restraint punch 114, and the second restraint punch 116 are sequentially arranged (in the lower direction of FIG. 2). As shown in FIG. 2, the reduced-diameter tooth shaping die 148 includes a diameter reducing die 158 and a tooth shaping die 160. A draw shaping hole 151, a diameter-reducing shaping hole 153, a tooth shaping hole 155, and a thickening shaping hole 157, into which the first restraint punch 114, the second restraint punch 116, the toothed punch 118, the compression punch 120, and so forth are to be inserted, are formed on the inner side of inner peripheral surfaces 152, 159, 161, and 162 of the drawing die 146, the diameter reducing die 158, the tooth shaping die 160, and the backing plate 150, respectively. FIG. 2 is an enlarged view showing a main portion around the die portion 122.

As shown in FIG. 2, an entrance portion 154 of the inner peripheral surface 152 of the drawing die 146 has a tapered shape with its inside diameter becoming smaller in the direction in which the toothed punch 118 relatively moves with respect to the drawing die 146 (in the lower direction of FIG. 2) in a draw shaping process to be discussed later. The inside diameter of the diameter reducing die 158 is gradually reduced in the direction in which the toothed punch 118, the first restraint punch 114, and the second restraint punch 116 are sequentially arranged (in the lower direction of FIG. 2). The inside diameter of the tooth shaping die 160 is the same as the minimum of the inside diameter of the diameter reducing die 158.

The inner peripheral surface 159 of the diameter reducing die 158 and the inner peripheral surface 161 of the tooth shaping die 160 are formed in a toothed shape in order to form teeth in an inclined side wall portion 182 (see FIG. 9) and the preliminary side wall portion 64 (see FIG. 13) to be discussed later together with the toothed punch 118 described above. The backing plate 150 includes the inner peripheral surface 162 and a chamfer shaping portion 168.

[Manufacturing Method]

Next, a manufacturing method for the cup-shaped workpiece 10 which uses the manufacturing device 101 configured as described above will be described. The manufacturing method for the cup-shaped workpiece 10 according to the embodiment includes the workpiece placement process, a step shaping process, the draw shaping process, a reduced-diameter tooth shaping process, and a releasing process.

<Workpiece Placement Process>

Figure 3:
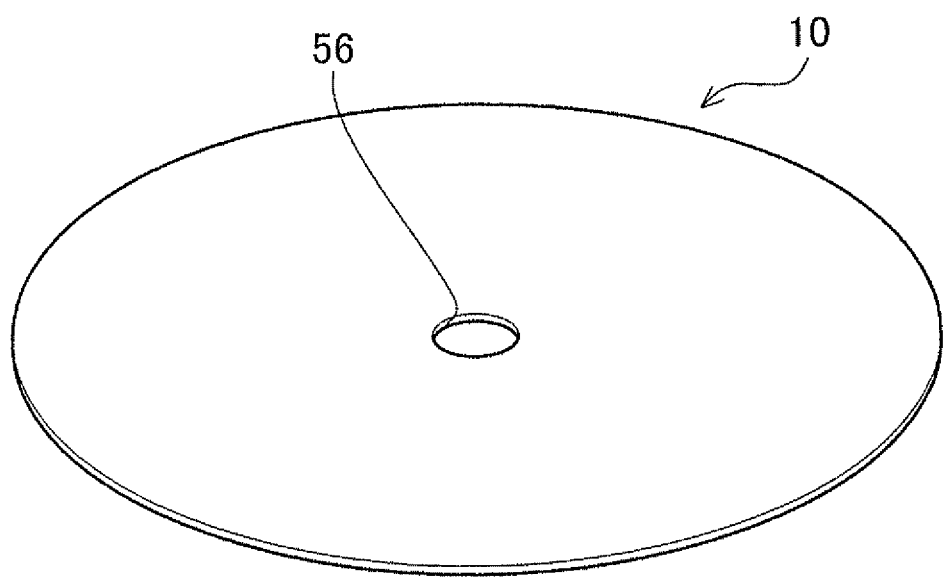
FIG. 3 is a perspective view showing the appearance of a workpiece before being shaped.

First, in the workpiece placement process, as shown in FIG. 1, the workpiece 10 having a flat disk shape and made of a metal is placed on the second distal-end surface 134 of the second restraint punch 116. As shown in FIG. 3, a hole portion 56 is formed in advance in the center portion of the workpiece 10 before being shaped.

Figure 4:
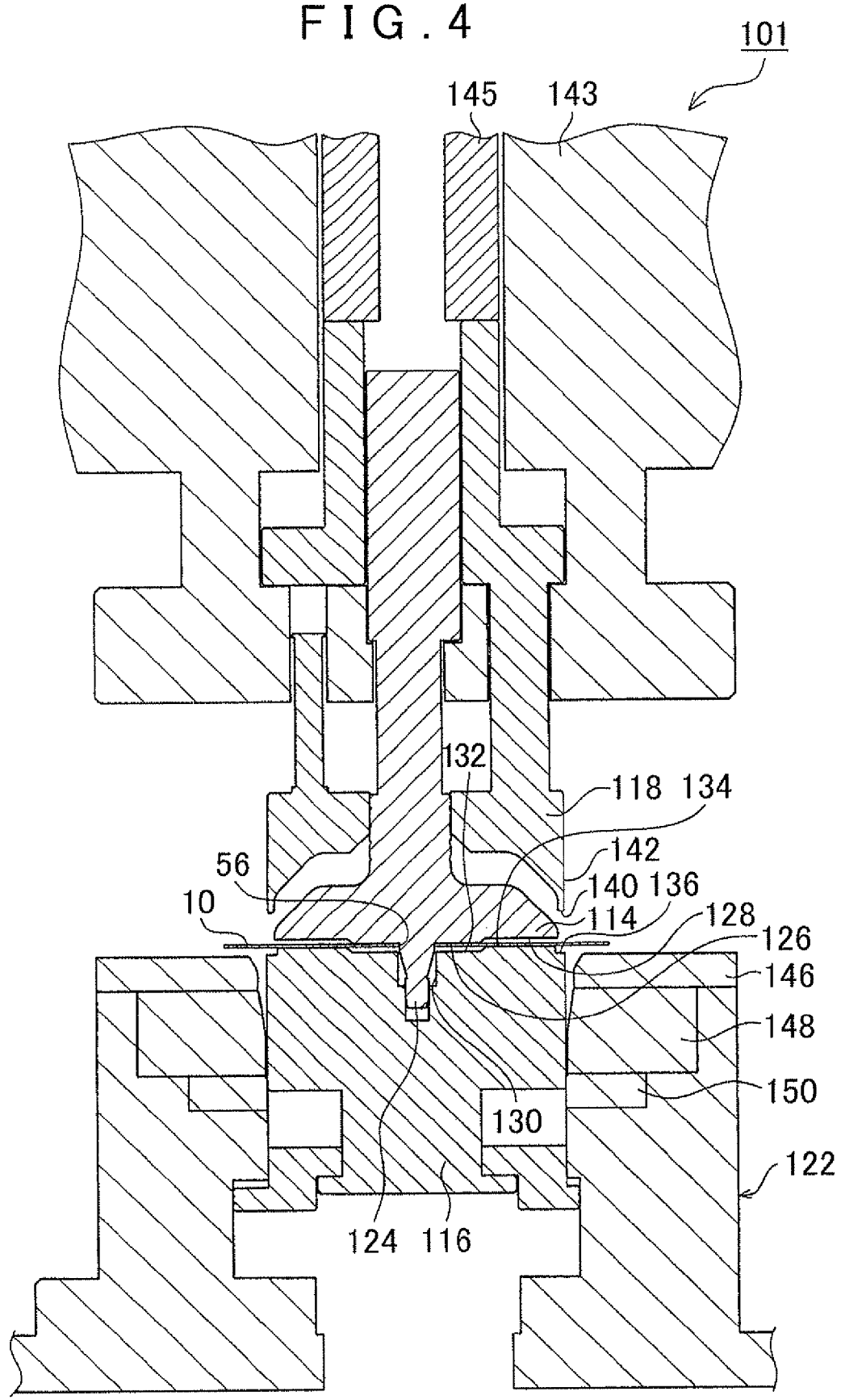
FIG. 4 shows the overall configuration of the manufacturing device for the cup-shaped workpiece in a workpiece placement process.

Then, as shown in FIG. 4, the first restraint punch 114, the toothed punch 118, and the first slide shaft 143 are relatively advanced with respect to the second restraint punch 116 and the die portion 122 (moved in the lower direction of FIG. 4) with the second restraint punch 116 stationary. Then, the first distal-end surface 126 of the first restraint punch 114 is brought into abutment with the workpiece 10 while inserting the projecting portion 124 of the first restraint punch 114 into the hole portion 56 of the workpiece 10. At this time, the projecting portion 124 of the first restraint punch 114 is inserted into the recessed portion 130 of the second restraint punch 116. Inserting the projecting portion 124 of the first restraint punch 114 into the hole portion 56 of the workpiece 10 in this way can restrict the positional relationship between the workpiece 10 and the first restraint punch 114 in the radial direction of the workpiece 10, which allows positioning between the workpiece 10 and each of the shaping dies.

<Step Shaping Process>

Figure 5:
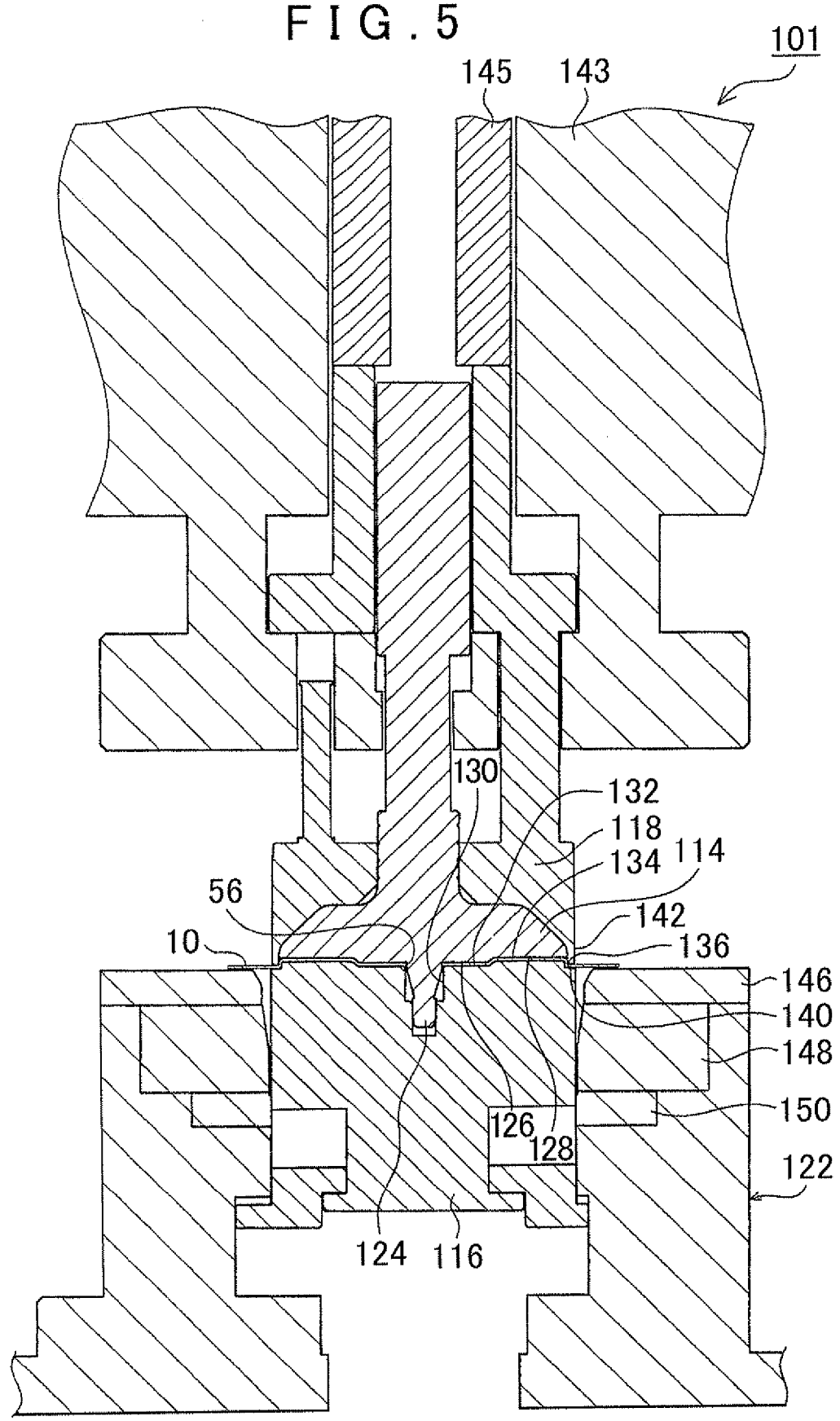
FIG. 5 shows the overall configuration of the manufacturing device for the cup-shaped workpiece in a step shaping process.
Figure 6:
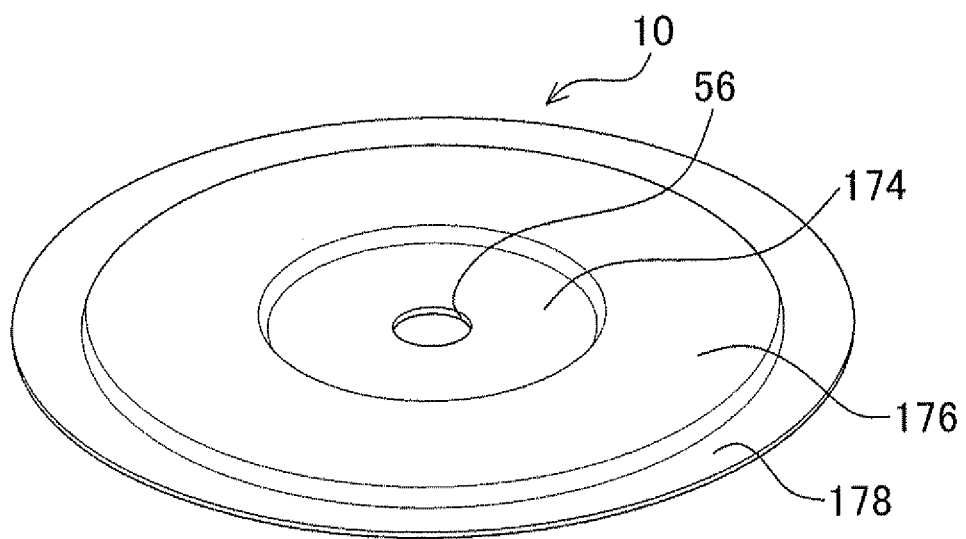
FIG. 6 is a perspective view showing the appearance of the workpiece after the step shaping process is performed.

Next, in the step shaping process, as shown in FIG. 5, the first restraint punch 114, the toothed punch 118, and the first slide shaft 143 are relatively advanced with respect to the second restraint punch 116 and the die portion 122 (moved in the lower direction of FIG. 5) with the second restraint punch 116 stationary. Then, the first distal-end surface 126 of the first restraint punch 114, the second distal-end surface 128 of the first restraint punch 114, and the distal-end surface 140 of the toothed punch 118 are brought into abutment with the workpiece 10. At this time, the workpiece 10 is pressurized by the first distal-end surface 126 of the first restraint punch 114 and the distal-end surface 140 of the toothed punch 118. Consequently, as shown in FIG. 6, a step is formed between a first portion 174 on the outer side of the hole portion 56 of the workpiece 10 and a second portion 176 outward of the first portion 174. In addition, a step is formed between the second portion 176 of the workpiece 10 and a third portion 178 outward of the second portion 176. In this way, the second portion 176 of the workpiece 10 is projected with respect to the first portion 174 and the third portion 178.

In the cup-shaped workpiece 10 (see FIG. 12) to be discussed later, the first portion 174 corresponds to an inner bottom surface portion 58, and the second portion 176 corresponds to an intermediate bottom surface portion 60. In the cup-shaped workpiece 10 to be discussed later, in addition, a part of the third portion 178 on the inner peripheral side corresponds to an outer bottom surface portion 62.

In this way, the workpiece 10 is restrained by the first restraint punch 114, the second restraint punch 116, and the toothed punch 118 with a step formed between the first portion 174 of the workpiece 10 and the second portion 176 and between the second portion 176 and the third portion 178.

<Draw Shaping Process>

Figure 7:
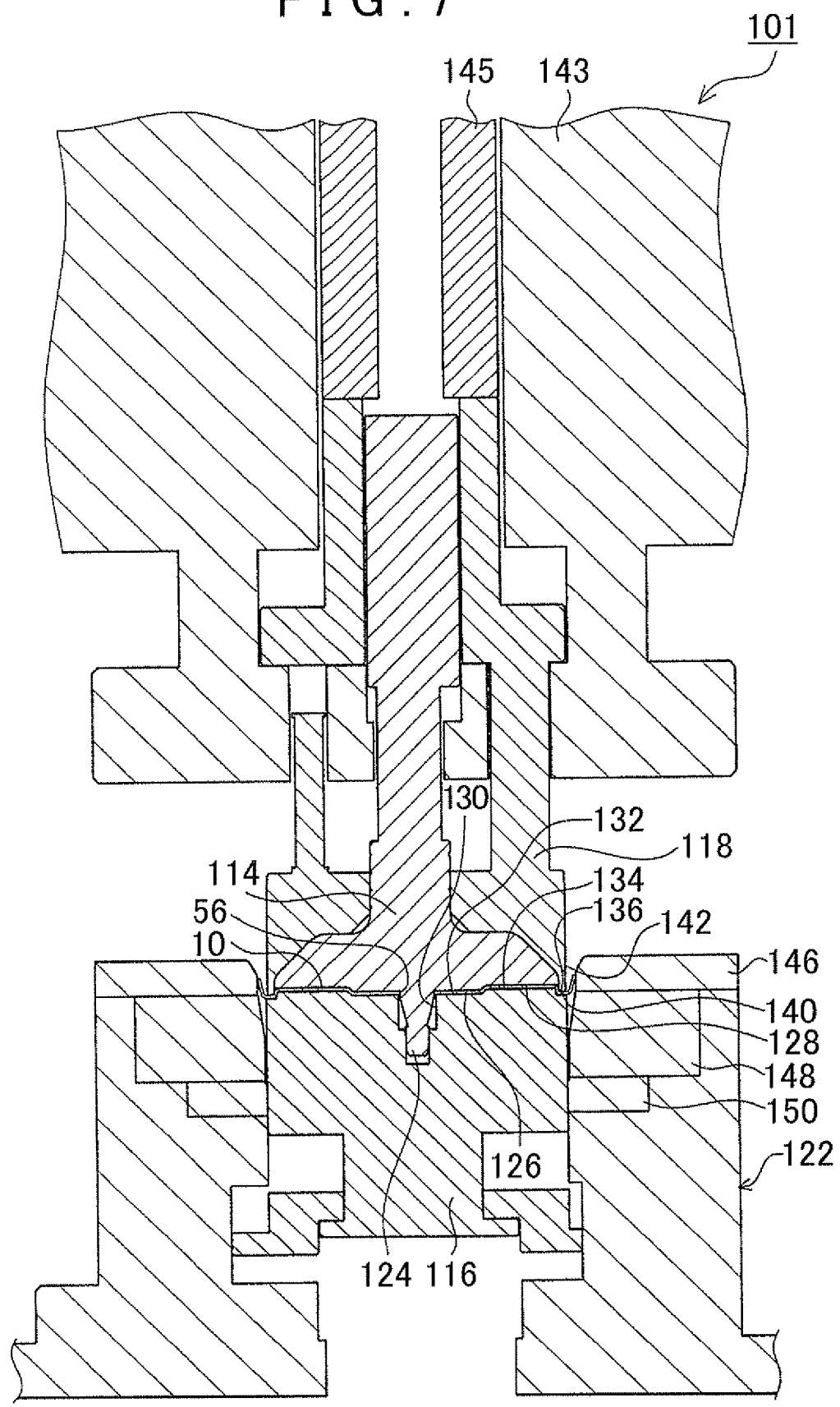
FIG. 7 shows the overall configuration of the manufacturing device for the cup-shaped workpiece in a draw shaping process.

Next, in the draw shaping process, as shown in FIG. 7, the first restraint punch 114, the second restraint punch 116, the toothed punch 118, and the first slide shaft 143 are relatively advanced with respect to the die portion 122 (moved in the lower direction of FIG. 7) with the workpiece 10 restrained by the first restraint punch 114, the second restraint punch 116, and the toothed punch 118.

Figure 8:
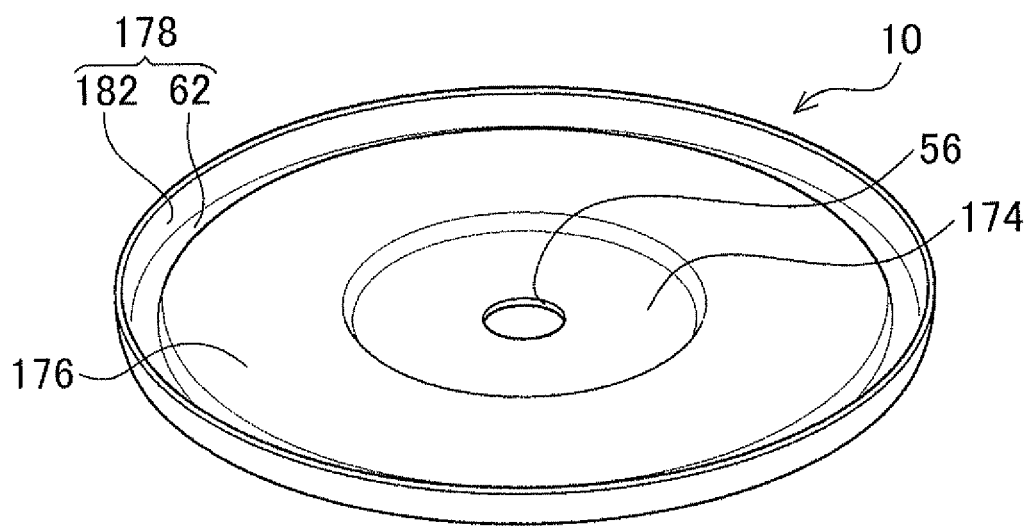
FIG. 8 is a perspective view showing the appearance of the workpiece after the draw shaping process is performed.
Figure 9:
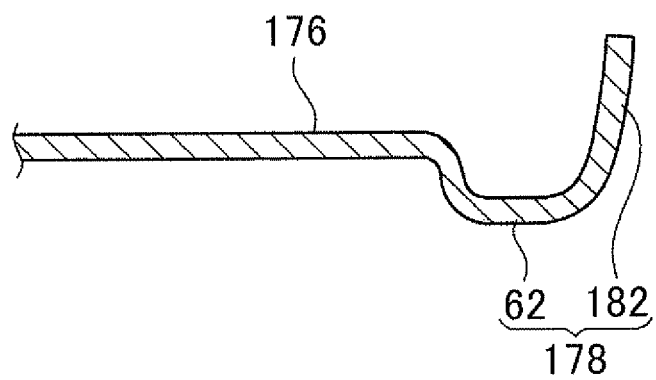
FIG. 9 is an enlarged sectional view showing the outer circumferential portion of the workpiece after the draw shaping process is performed.

Consequently, draw shaping is performed on the workpiece 10 by the toothed punch 118 and the drawing die 146 of the die portion 122. Then, as shown in FIGS. 8 and 9, the third portion 178 of the workpiece 10 is bent to form the outer bottom surface portion 62 and the inclined side wall portion 182 provided to extend upright from an outer peripheral end portion of the outer bottom surface portion 62. Here, the inside diameter of the inclined side wall portion 182 becomes gradually larger in the direction away from the outer bottom surface portion 62 so that the inclined side wall portion 182 is formed in a conical shape.

<Reduced-Diameter Tooth Shaping Process>

Figure 10:
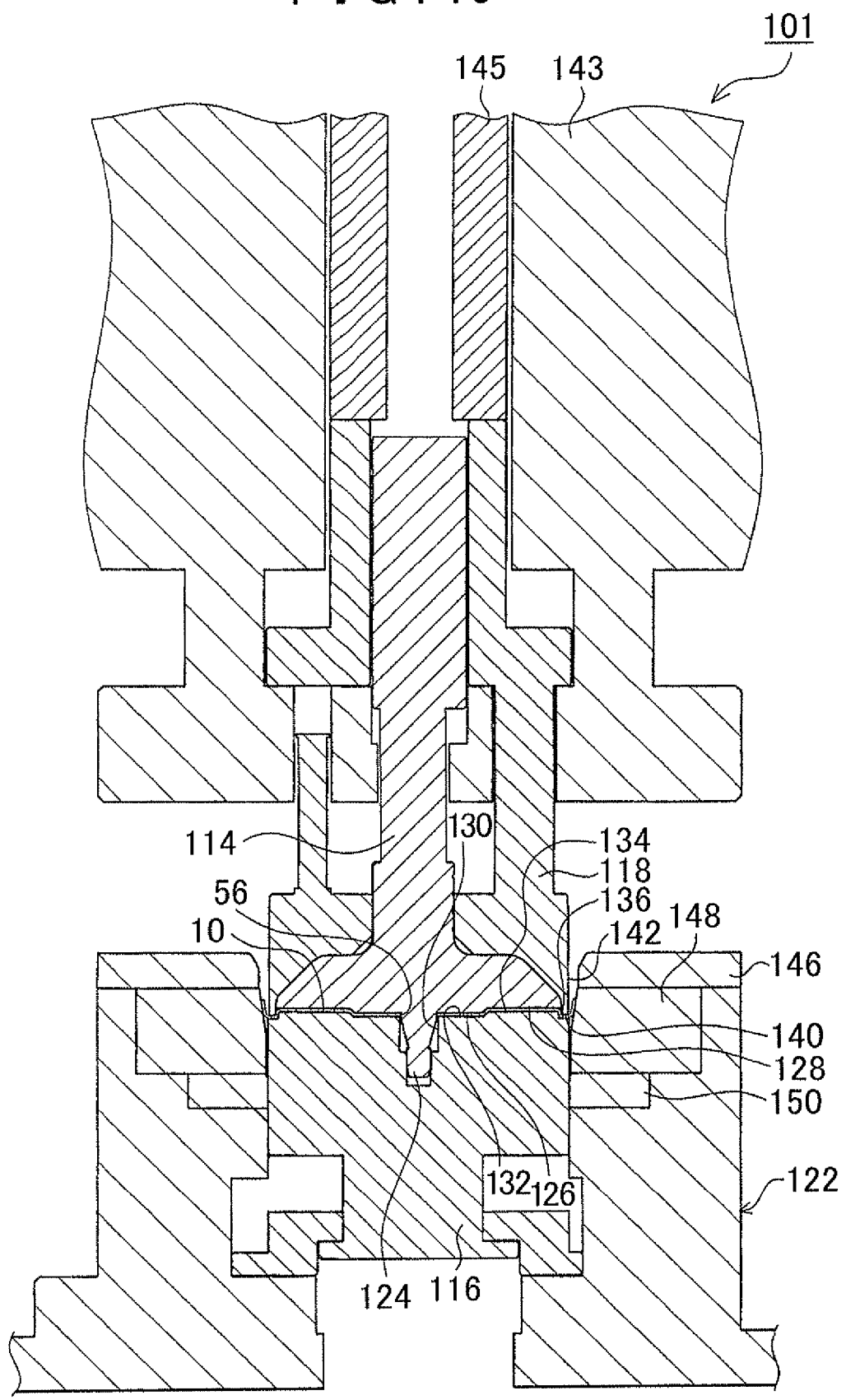
FIG. 10 shows the overall configuration of the manufacturing device for the cup-shaped workpiece in a reduced-diameter tooth shaping process.

Next, in the reduced-diameter tooth shaping process, as shown in FIG. 10, the first restraint punch 114, the second restraint punch 116, the toothed punch 118, and the first slide shaft 143 are relatively advanced with respect to the die portion 122 (moved in the lower direction of FIG. 10) with the workpiece 10 restrained by the first restraint punch 114, the second restraint punch 116, and the toothed punch 118. Now, diameter-reducing shaping is performed on the workpiece 10 by the toothed punch 118 and the diameter reducing die 158 (see FIG. 2) of the die portion 122. Teeth are formed on the inner peripheral surface 159 (see FIG. 2) of the diameter reducing die 158. Thus, teeth are gradually formed in the inclined side wall portion 182 of the workpiece 10 at the same time in the diameter-reducing shaping.

Figure 11:
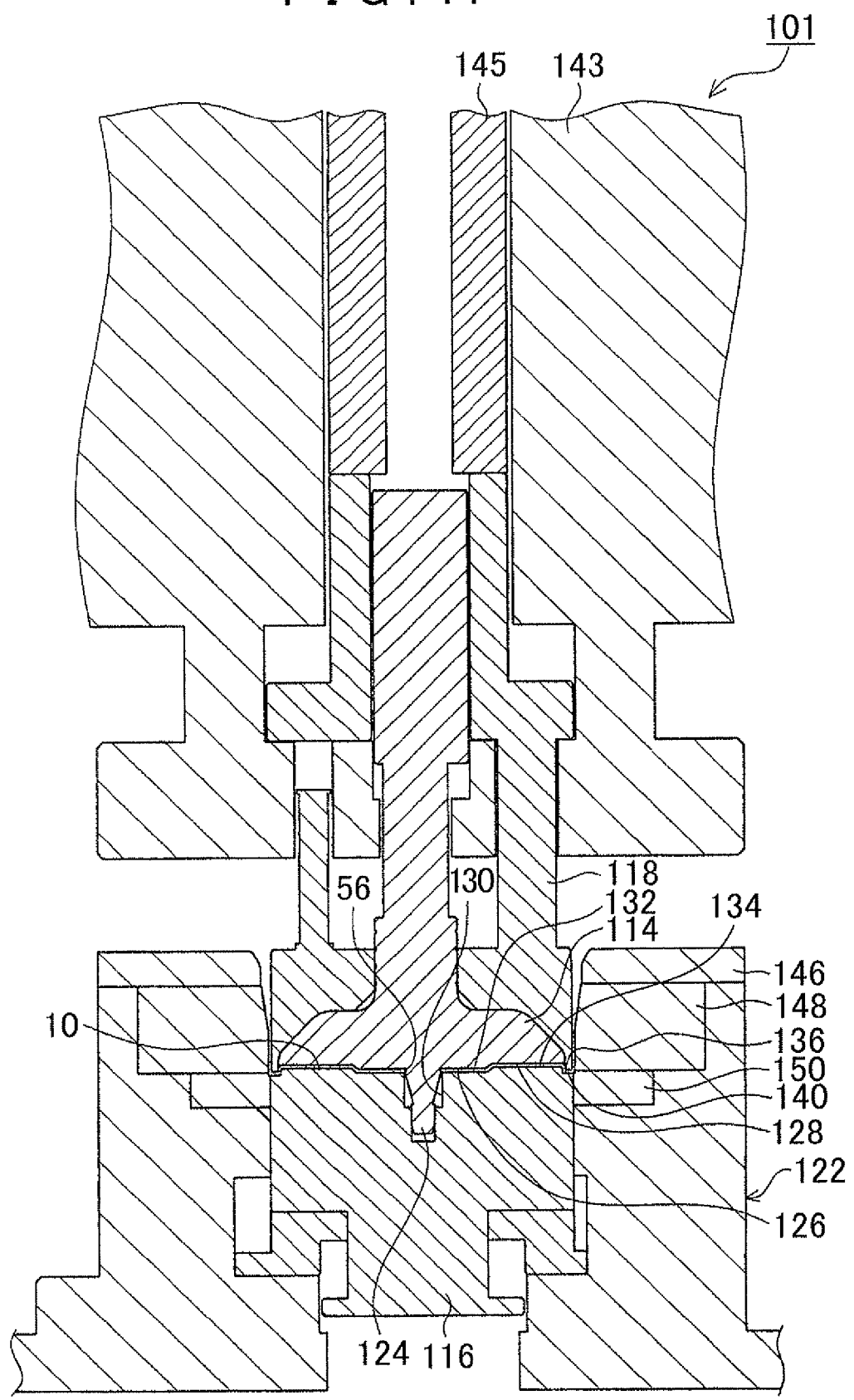
FIG. 11 shows the overall configuration of the manufacturing device for the cup-shaped workpiece after the reduced-diameter tooth shaping process is performed.
Figure 12:
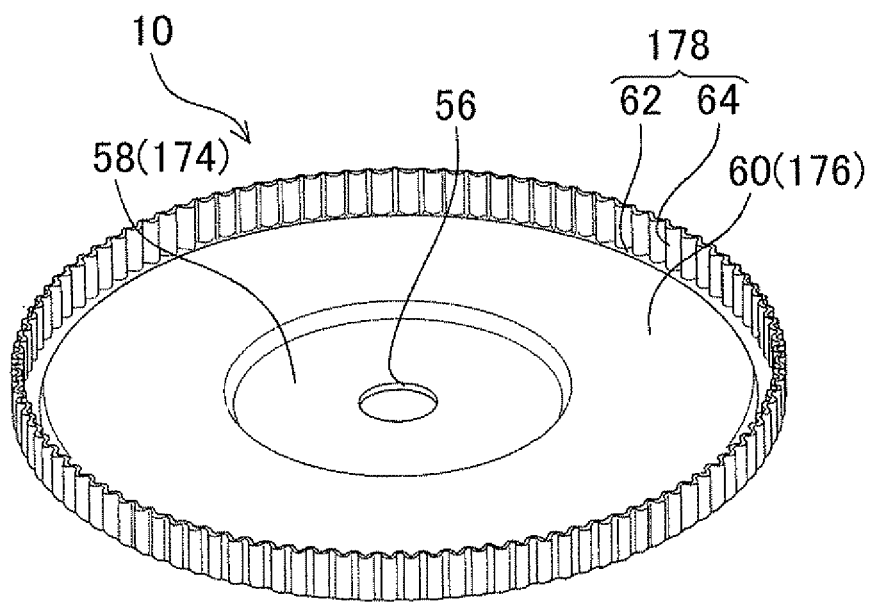
FIG. 12 is a perspective view showing the appearance of the workpiece after the reduced-diameter tooth shaping process is performed.
Figure 13:
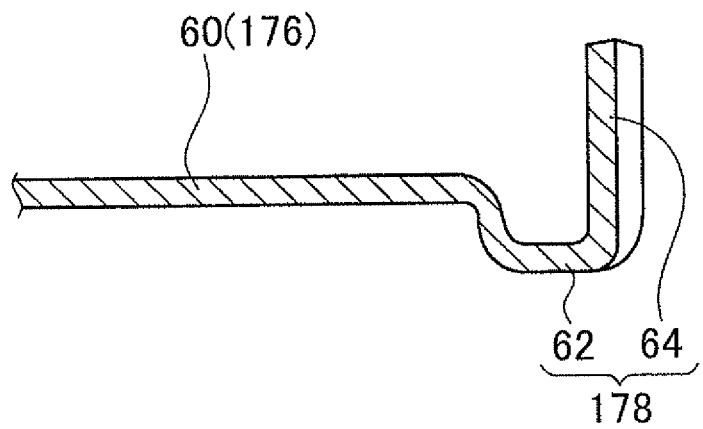
FIG. 13 is an enlarged sectional view showing the outer circumferential portion of the workpiece after the reduced-diameter tooth shaping process is performed.

When the first restraint punch 114, the second restraint punch 116, the toothed punch 118, and the first slide shaft 143 are further relatively advanced with respect to the die portion 122 (moved in the lower direction of FIG. 10), preliminary tooth shaping is performed on the workpiece 10 by the toothed punch 118 and the tooth shaping die 160 (see FIG. 2) of the die portion 122 as shown in FIG. 11. Consequently, as shown in FIGS. 12 and 13, the preliminary side wall portion 64, which is provided to extend vertically upright from the outer bottom surface portion 62 of the third portion 178 of the workpiece 10 and which is formed with teeth, is formed. That is, the workpiece 10 is formed into a cup shape.

<Releasing Process>

Figure 14:
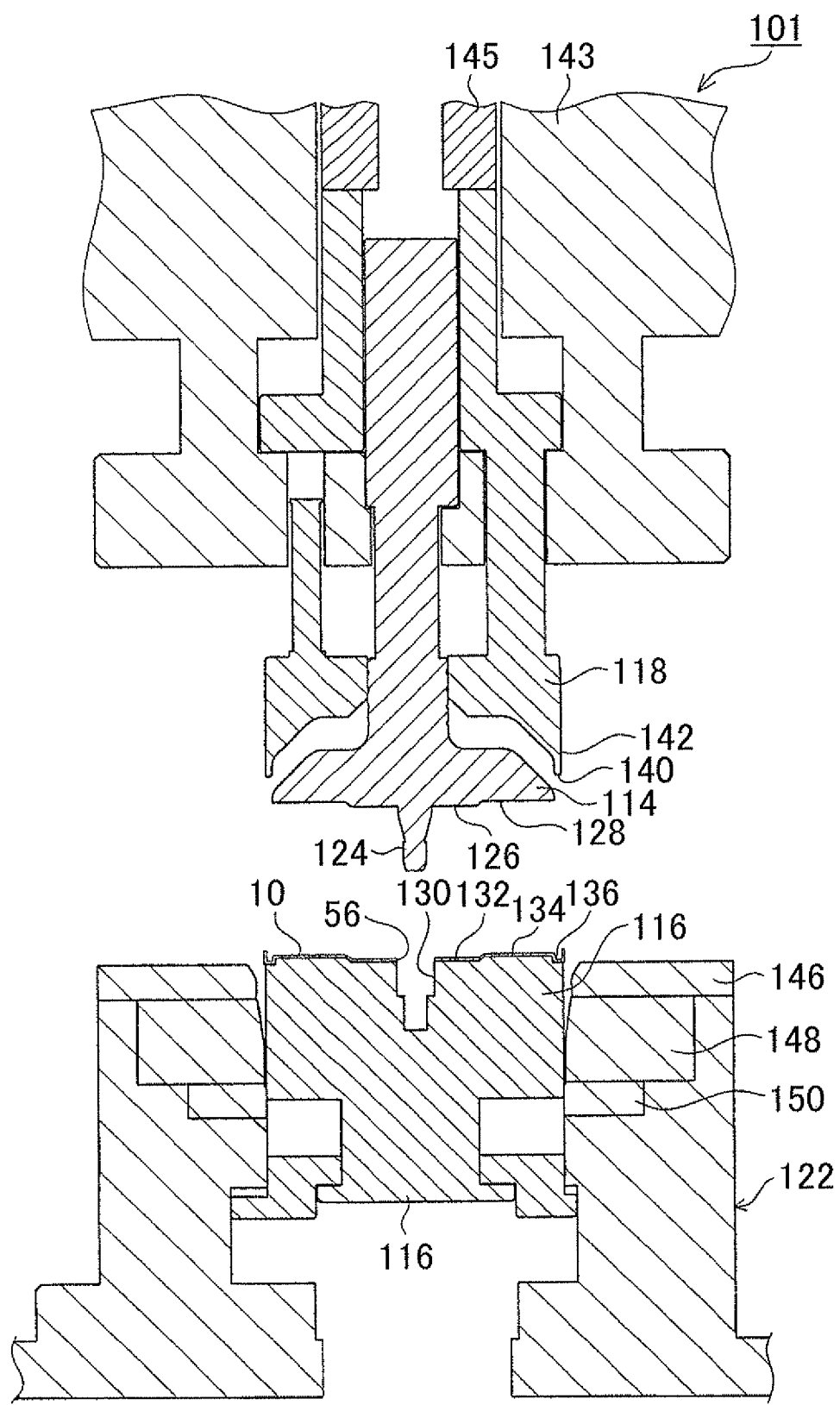
FIG. 14 shows the overall configuration of the manufacturing device for the cup-shaped workpiece in a releasing process.

Next, in the releasing process, as shown in FIG. 14, the first restraint punch 114, the second restraint punch 116, the toothed punch 118, and the first slide shaft 143 are retracted with respect to the die portion 122, and further the first restraint punch 114, the toothed punch 118, and the first slide shaft 143 are retracted with respect to the second restraint punch 116. Then, the cup-shaped workpiece 10 is taken out of the manufacturing device 101.

In this way, the cup-shaped workpiece 10 (see FIG. 12) including a bottom surface portion (the inner bottom surface portion 58, the intermediate bottom surface portion 60, and the outer bottom surface portion 62) and the preliminary side wall portion 64 provided to extend vertically upright from an outer peripheral end portion of the outer bottom surface portion 62 of the bottom surface portion can be manufactured from the disk-shaped workpiece 10.

<Manufacture of Drive Plate>

[Configuration of Manufacturing Device]

Next, the configuration of a manufacturing device 1 for a drive plate will be described. The manufacturing device 1 for a drive plate processes a workpiece 10 which is a cup-shaped raw material to manufacture a drive plate 12 (see FIG. 27) formed integrally with a ring gear portion 71 (side wall portion 70).

Figure 15:
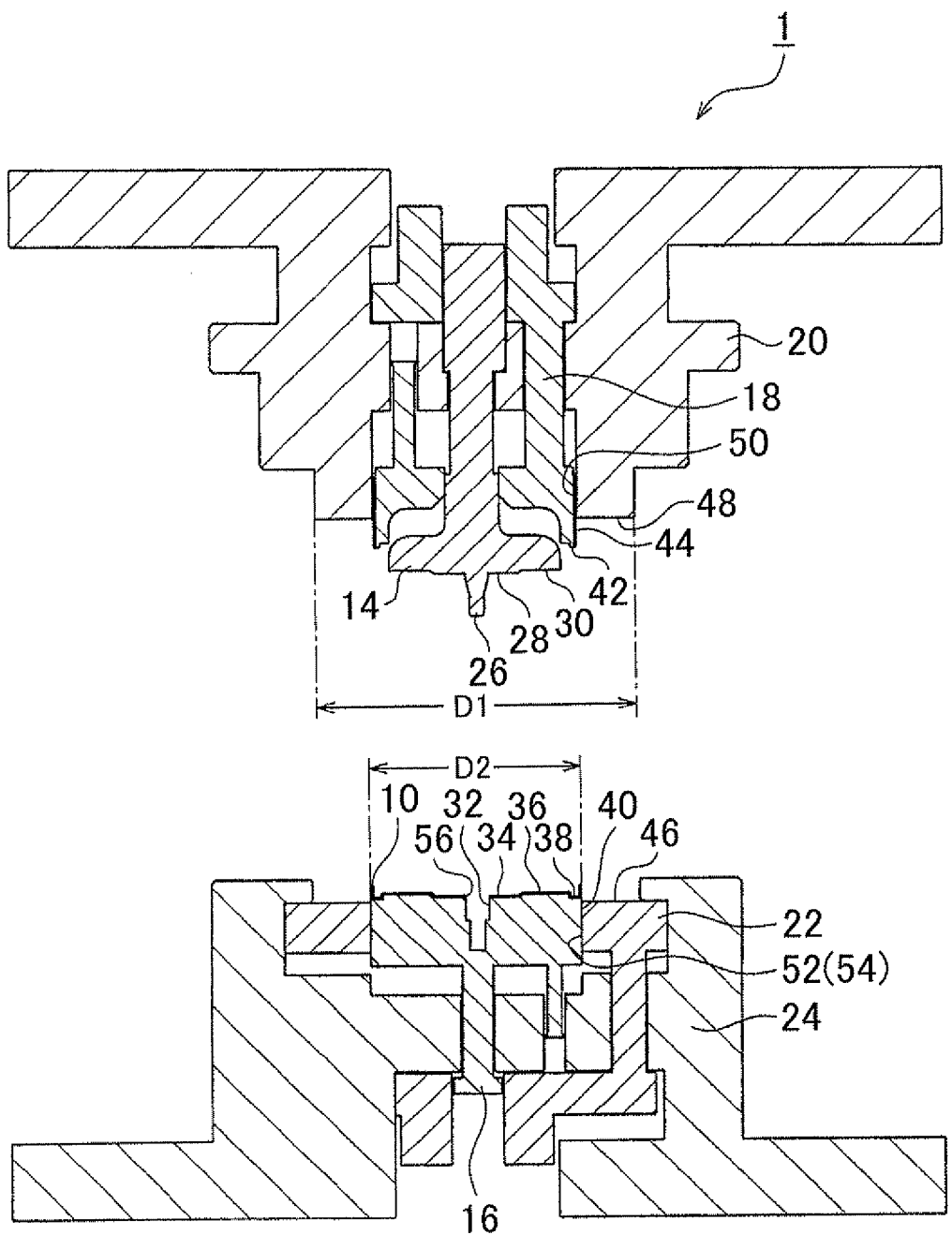
FIG. 15 shows the overall configuration of a manufacturing device for a drive plate in a workpiece placement process.

FIG. 15 shows the overall configuration of the manufacturing device 1 for a drive plate. FIG. 15 shows a state in a workpiece placement process to be discussed later. As shown in FIG. 15, the manufacturing device 1 for a drive plate includes a first restraint punch 14, a second restraint punch 16, a third restraint punch 18, a compression punch 20, a compression die 22, and a stationary die 24.

The first restraint punch 14 is disposed at a position at which it faces the second restraint punch 16 (at a position in the upper direction of FIG. 1). A surface of the first restraint punch 14 facing the second restraint punch 16 is formed to have a circular outer shape. The surface of the first restraint punch 14 includes a projecting portion 26, a first distal-end surface 28, a second distal-end surface 30, and so forth.

The projecting portion 26 is provided at the center portion of the surface of the first restraint punch 14 facing the second restraint punch 16, and shaped to project on the side of the second restraint punch 16 (on the lower side of FIG. 15) with respect to the first distal-end surface 28 and the second distal-end surface 30. The first distal-end surface 28 is provided on the outer peripheral side of the first restraint punch 14 (on the left-right side of FIG. 1) with respect to the projecting portion 26. The second distal-end surface 30 is provided on the outer peripheral side of the first restraint punch 14 (on the left-right side of FIG. 1) with respect to the first distal-end surface 28. The first distal-end surface 28 is provided on the side of the second restraint punch 16 (on the lower side of FIG. 1) with respect to the second distal-end surface 30.

The second restraint punch 16 is disposed at a position at which it faces the first restraint punch 14 (at a position in the lower direction of FIG. 15). A surface of the second restraint punch 16 facing the first restraint punch 14 is formed to have a circular outer shape. The surface of the second restraint punch 16 includes a recessed portion 32, a first distal-end surface 34, a second distal-end surface 36, an outer periphery facing surface 38, and so forth. A toothed shape is formed on an outer peripheral surface 40 of the second restraint punch 16 along a toothed shape formed on an inner peripheral surface 52 of the compression die 22 to be discussed later.

The recessed portion 32 is provided at the center portion of the surface of the second restraint punch 16 facing the first restraint punch 14, and shaped to be recessed on the side opposite the direction of the first restraint punch 14 (on the lower side of FIG. 15) with respect to the first distal-end surface 34 and the second distal-end surface 36. The first distal-end surface 34 is provided on the outer peripheral side of the second restraint punch 16 (on the left-right side of FIG. 15) with respect to the recessed portion 32. The second distal-end surface 36 is provided on the outer peripheral side of the second restraint punch 16 with respect to the first distal-end surface 34. The outer periphery facing surface 38 is provided on the outer peripheral side of the second restraint punch 16 with respect to the second distal-end surface 36. The second distal-end surface 36 is provided on the direction of the first restraint punch 14 (on the upper side of FIG. 15) with respect to the first distal-end surface 34 and the outer periphery facing surface 38.

The third restraint punch 18 is disposed outward of the first restraint punch 14. The third restraint punch 18 is provided with a distal-end surface 42 facing the second restraint punch 16. The distal-end surface 42 is provided along the shape of the outer periphery of the third restraint punch 18, and provided at a position at which it faces a part of the outer circumferential portion of the second distal-end surface 36 of the second restraint punch 16 and the outer periphery facing surface 38 of the second restraint punch 16. An outer peripheral surface 44 provided to extend upright from an outer peripheral end portion of the distal-end surface 42 of the third restraint punch 18 is formed in a toothed shape in order to form teeth in the preliminary side wall portion 64 (see FIG. 12) together with the compression die 22. As discussed later, the third restraint punch 18 restrains a part of the intermediate bottom surface portion 60 and the outer bottom surface portion 62 of the workpiece 10 from the side in which the preliminary side wall portion 64 extends upright in the axial direction at a location on the inner side of the workpiece 10 in the radial direction (see FIG. 19).

The compression punch 20 is disposed outward of the third restraint punch 18. The compression punch 20 is provided with a distal-end surface 48 that faces a part of the outer circumferential portion of the outer periphery facing surface 38 of the second restraint punch 16 and a surface 46 of the compression die 22. An inner peripheral surface 50 of the compression punch 20 is formed in a toothed shape so as to extend along the toothed shape of the outer peripheral surface 44 of the third restraint punch 18.

The compression die 22 is disposed outward of the second restraint punch 16 to face the compression punch 20 in the axial direction (in the lower direction of FIG. 15). The compression die 22 is provided with the surface 46 facing the distal-end surface 48 of the compression punch 20. The inner peripheral surface 52 of the compression die 22 is formed in a toothed shape in order to form a toothed shape in the preliminary side wall portion 64 together with the third restraint punch 18. A shaping hole 54 that enables insertion and movement of the first restraint punch 14, the second restraint punch 16, and the third restraint punch 18 is provided on the inner side of the inner peripheral surface 52 of the compression die 22.

A dimension (outside diameter of the distal-end surface 48) D1 of the outside portion of the compression punch 20 in the radial direction (in the left-right direction of FIG. 15) is larger than a radial dimension (root diameter) D2 of a tooth root portion 68 (see FIG. 19) of the toothed shape on the inner peripheral surface 52 of the compression die 22.

The stationary die 24 is disposed outward of the second restraint punch 16 and the compression die 22.

In the embodiment, the first restraint punch 14 and the third restraint punch 18 are provided individually. However, a restraint punch in which the first restraint punch 14 and the third restraint punch 18 are integrated with each other may also be used.

[Manufacturing Method]

Next, a manufacturing method for the drive plate 12 which uses the manufacturing device 1 for a drive plate configured as described above will be described. The manufacturing method for the drive plate 12 according to the embodiment includes the workpiece placement process, a workpiece restraint process, a workpiece insertion process, a compression process, and a releasing process.

<Workpiece Placement Process>

First, in the workpiece placement process, as shown in FIG. 15, the workpiece 10 which is a cup-shaped raw material made of a metal is placed on the second restraint punch 16. As shown in FIG. 12, the hole portion 56 is formed in the center portion of the workpiece 10. The inner bottom surface portion 58 is formed outward of the hole portion 56. In addition, the intermediate bottom surface portion 60 is formed outward of the inner bottom surface portion 58. Further, the outer bottom surface portion 62 is formed outward of the intermediate bottom surface portion 60. The preliminary side wall portion 64 which is cylindrical is formed to extend upright in the axial direction of the workpiece 10 (in the upper direction of FIG. 12) from an outer peripheral end portion of the outer bottom surface portion 62. The preliminary side wall portion 64 is formed with teeth in advance. The preliminary side wall portion 64 is an example of the "side wall portion" according to the present invention.

<Workpiece Restraint Process>

Next, in the workpiece restraint process, as shown in FIG. 16, the first restraint punch 14, the third restraint punch 18, and the compression punch 20 are relatively advanced with respect to the second restraint punch 16, the compression die 22, and the stationary die 24 (moved in the lower direction of FIG. 16) with the second restraint punch 16 and the compression die 22 stationary. Then, the first distal-end surface 28 and the second distal-end surface 30 of the first restraint punch 14 are brought into contact with the workpiece 10 while load applying means (not shown) is applying a load to the first restraint punch 14 in the direction in which the workpiece 10 is disposed (in the lower direction of FIG. 16). In addition, the distal-end surface 42 of the third restraint punch 18 is brought into contact with the workpiece 10 while load applying means (not shown) is applying a load to the third restraint punch 18 in the direction in which the workpiece 10 is disposed (in the lower direction of FIG. 16). At this time, the first restraint punch 14 and the third restraint punch 18 tightly contact each other. In this way, the workpiece 10 is restrained by the first restraint punch 14, the second restraint punch 16, and the third restraint punch 18.

At this time, in addition, the projecting portion 26 of the first restraint punch 14 is inserted into the hole portion 56 of the workpiece 10 and the recessed portion 32 of the second restraint punch 16. Inserting the projecting portion 26 of the first restraint punch 14 into the hole portion 56 of the workpiece 10 in this way can restrict the positional relationship between the workpiece 10 and the first restraint punch 14 in the radial direction of the workpiece 10, which allows positioning between the workpiece 10 and each of the shaping dies.

<Workpiece Insertion Process>

Figure 17:
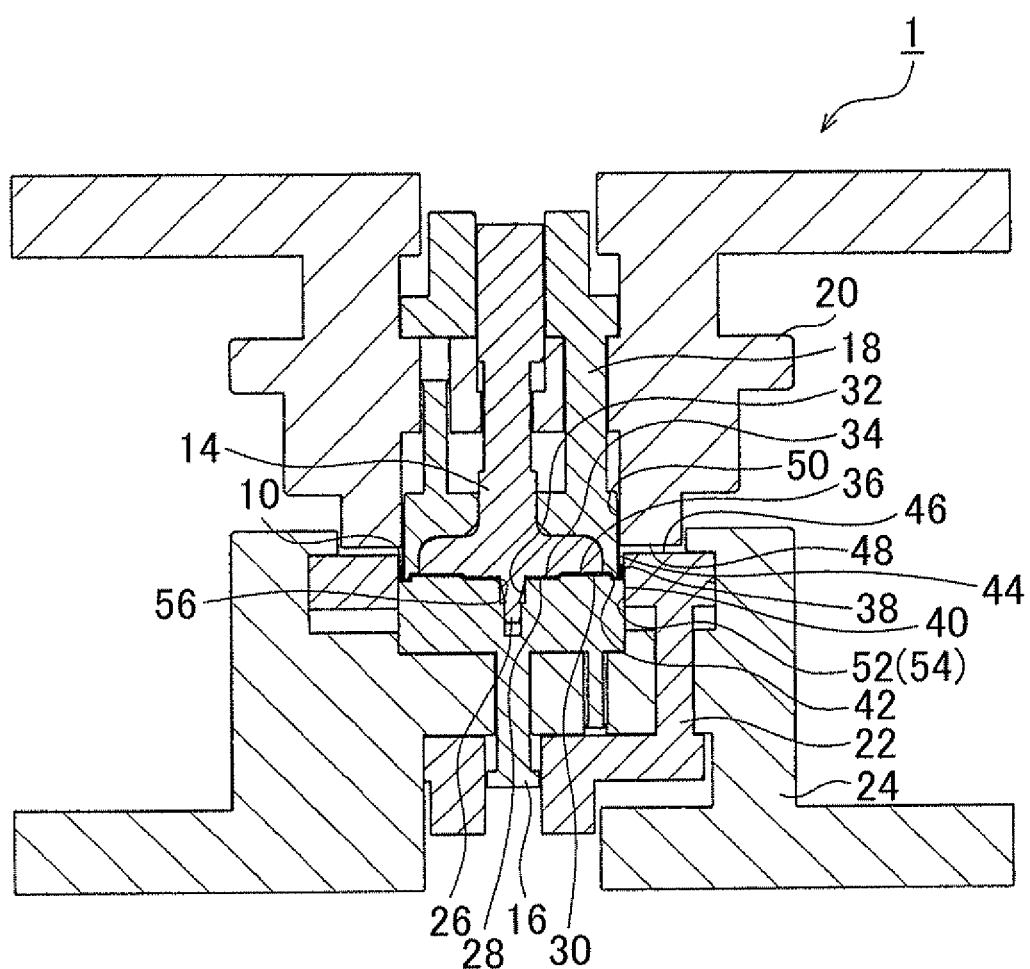
FIG. 17 shows the overall configuration of the manufacturing device for the drive plate in a workpiece insertion process.

Next, in the workpiece insertion process, as shown in FIG. 17, the first restraint punch 14, the second restraint punch 16, the third restraint punch 18, and the compression punch 20 are relatively advanced with respect to the compression die 22 (moved in the lower direction of FIG. 17) with the workpiece 10 restrained by the first restraint punch 14, the second restraint punch 16, and the third restraint punch 18. Consequently, the workpiece 10 is inserted into the shaping hole 54 of the compression die 22 together with the first restraint punch 14, the second restraint punch 16, and the third restraint punch 18.

<Compression Process>

Figure 18:
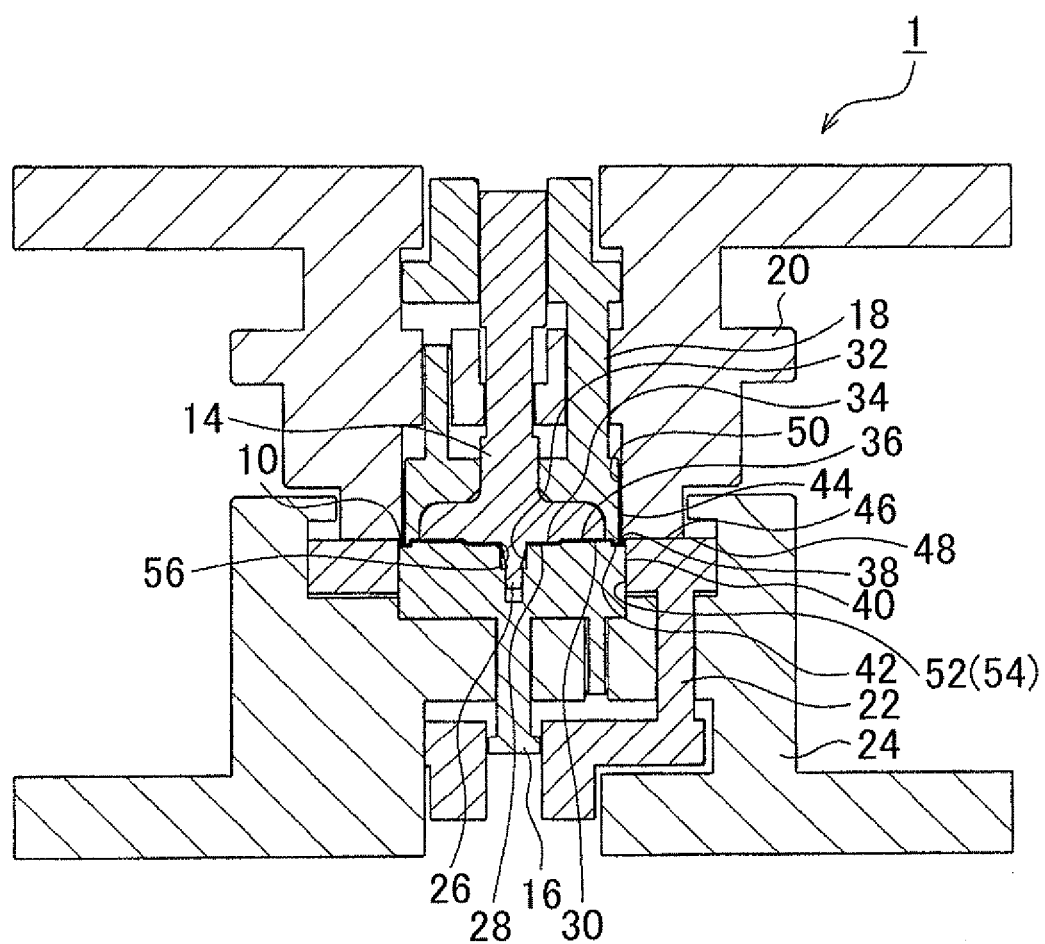
FIG. 18 shows the overall configuration of a manufacturing device for a drive plate in a compression process according to a first embodiment.

Next, in the compression process, as shown in FIG. 18, the compression punch 20 is relatively advanced with respect to the compression die 22 (moved in the lower direction of FIG. 18) with the cup-shaped workpiece 10 restrained by the first restraint punch 14, the second restraint punch 16, and the third restraint punch 18. Now, first, the compression punch 20 contacts the compression die 22. Then, after the compression punch 20 contacts the compression die 22, the compression die 22 is pushed by the compression punch 20 to be moved. In this way, both the compression punch 20 and the compression die 22 are relatively advanced in the axial direction of the workpiece 10 (toward the side opposite the side in which the preliminary side wall portion 64 extends upright from the outer bottom surface portion 62) with respect to the workpiece 10 restrained by the first restraint punch 14, the second restraint punch 16, and the third restraint punch 18.

Then, the compression punch 20 contacts the preliminary side wall portion 64 (see FIG. 12) of the workpiece 10 to perform thickened tooth shaping in which the preliminary side wall portion 64 of the workpiece 10 is compressed by the compression punch 20 in the axial direction of the workpiece 10 (in the lower direction of FIG. 18) to increase the thickness of the workpiece 10 in the preliminary side wall portion 64 in the radial direction.

Figure 19:
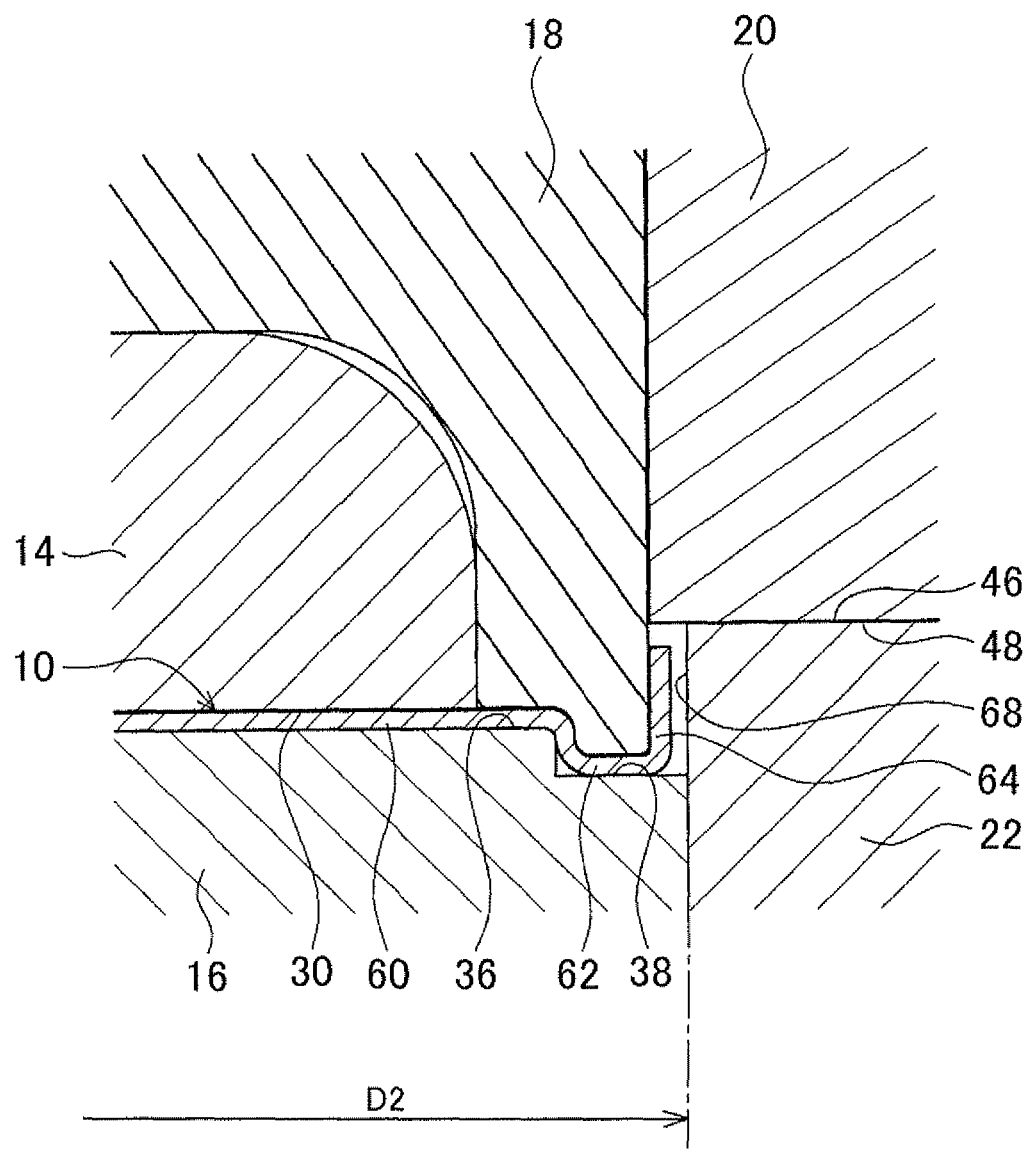
FIG. 19 is an enlarged sectional view showing the vicinity of the outer circumferential portion of a workpiece at the time when a compression punch contacts a compression die according to the first embodiment.
Figure 20:
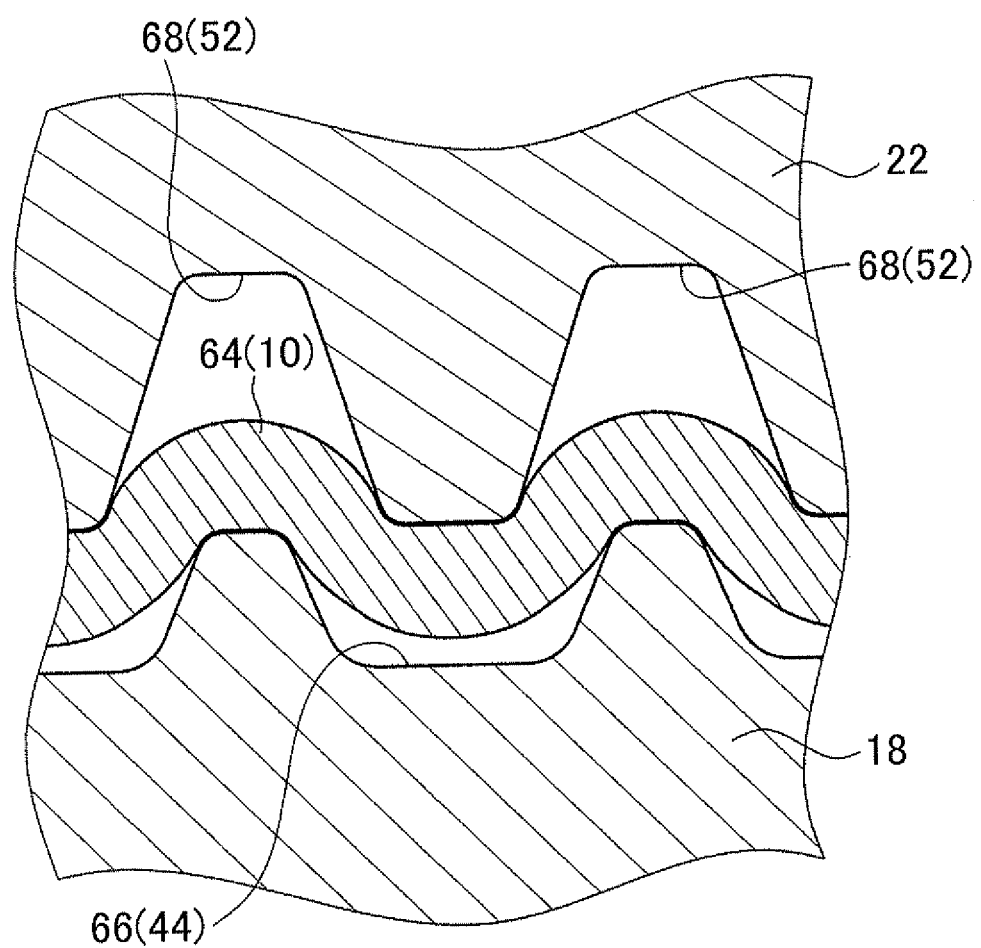
FIG. 20 is a cross-sectional view showing a main portion of a third restraint punch, the workpiece, and the compression die at the time when the compression punch contacts the compression die according to the first embodiment.

The compression process will be described in more detail. First, when the distal-end surface 48 of the compression punch 20 contacts the surface 46 of the compression die 22, an enlarged sectional view showing the vicinity of the outer circumferential portion of the workpiece 10 and a cross-sectional view showing a main portion of the third restraint punch 18, the workpiece 10, and the compression die 22 are as shown in FIGS. 19 and 20, respectively.

Figure 21:
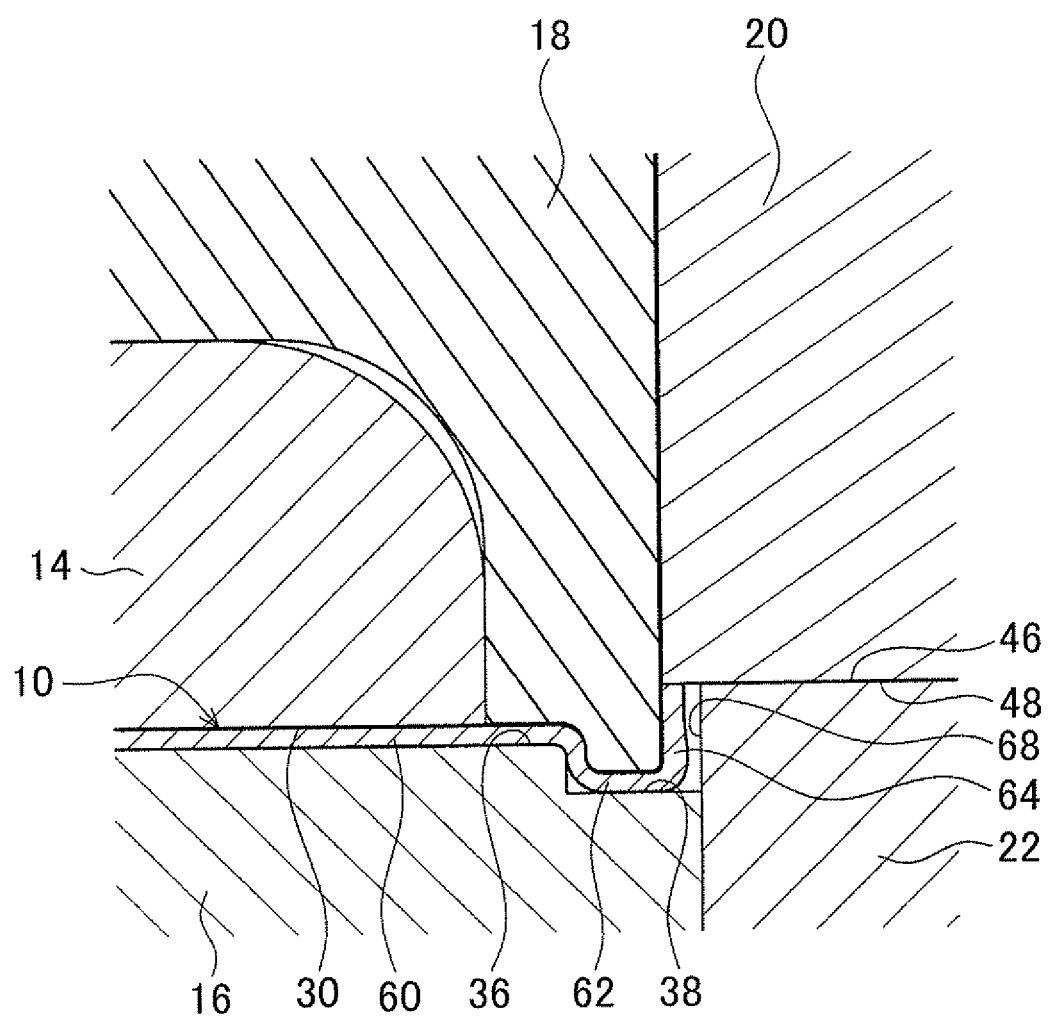
FIG. 21 is an enlarged sectional view showing the vicinity of the outer circumferential portion of the workpiece at the time when the compression punch starts compressing a preliminary side wall portion according to the first embodiment.
Figure 22:
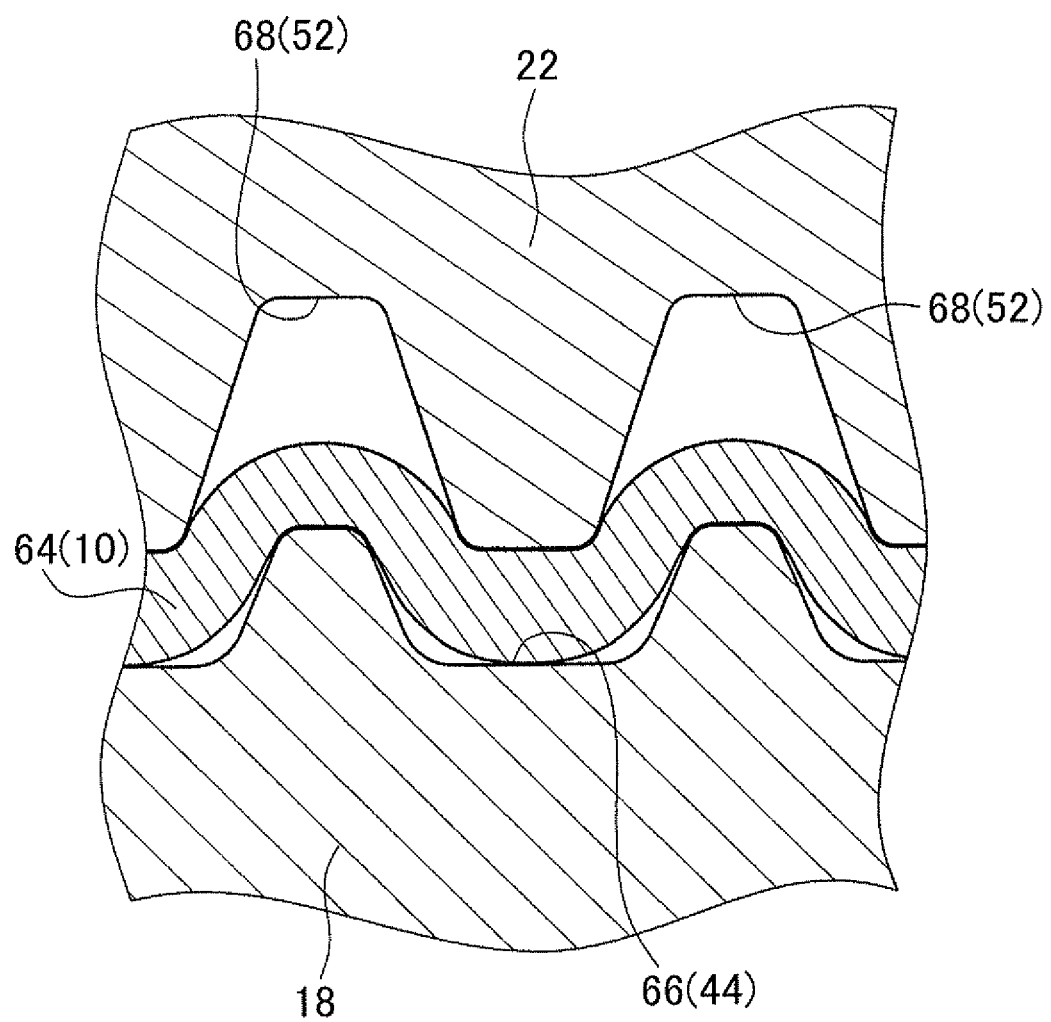
FIG. 22 is a cross-sectional view showing a main portion of the third restraint punch, the workpiece, and the compression die at the time when the compression punch starts compressing the preliminary side wall portion according to the first embodiment.

Then, after the distal-end surface 48 of the compression punch 20 contacts the surface 46 of the compression die 22, the compression die 22 is pushed by the compression punch 20 to be moved, and the compression punch 20 starts compressing the preliminary side wall portion 64 with the distal-end surface 48 of the compression punch 20 in contact with the distal-end surface of the preliminary side wall portion 64. Now, the height of the preliminary side wall portion 64 starts reducing as shown in FIG. 21. Then, at the same time, the preliminary side wall portion 64 starts expanding toward a tooth root portion 66 of the third restraint punch 18 and the tooth root portion 68 of the compression die 22 as shown in FIG. 22, which causes the thickness of the preliminary side wall portion 64 to start increasing.

Figure 23:
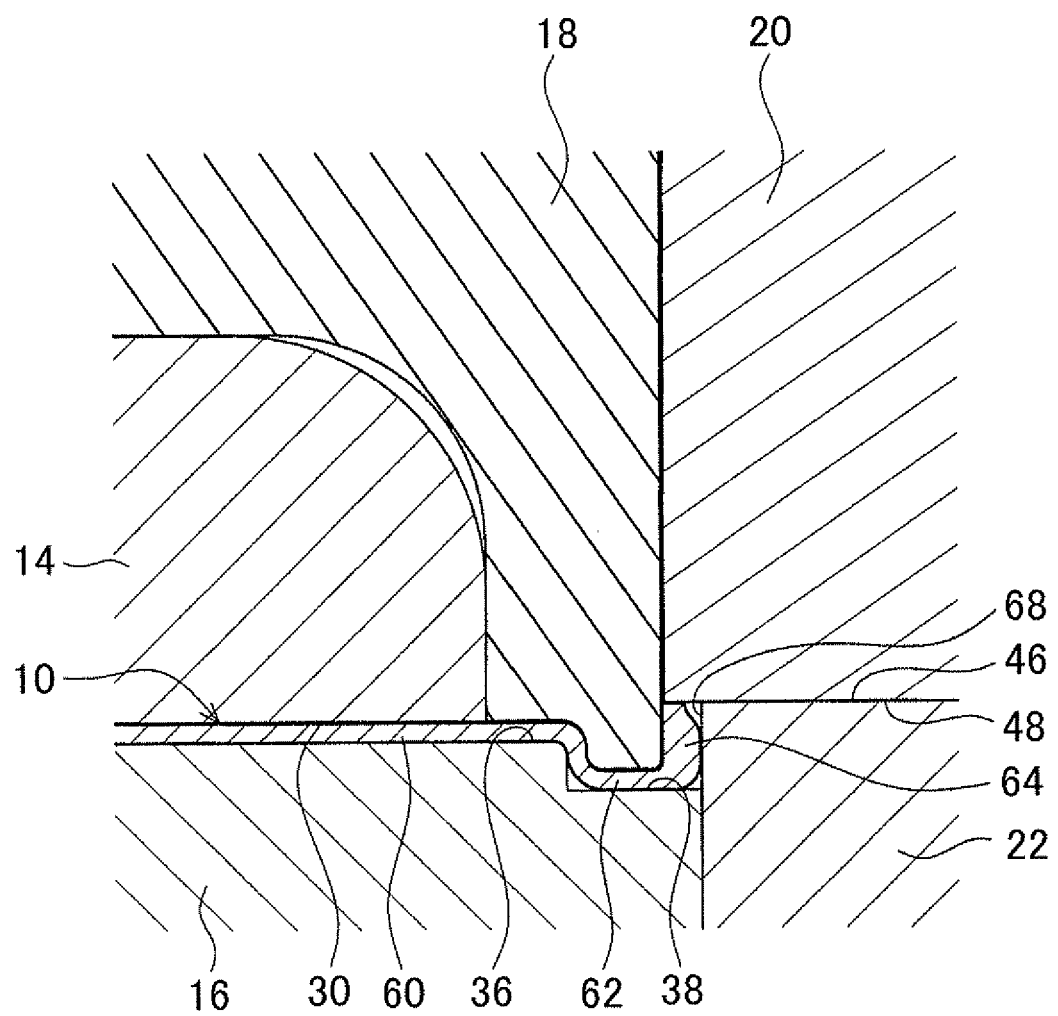
FIG. 23 is an enlarged sectional view showing the vicinity of the outer circumferential portion of the workpiece at the time when the compression process has further progressed according to the first embodiment.
Figure 24:
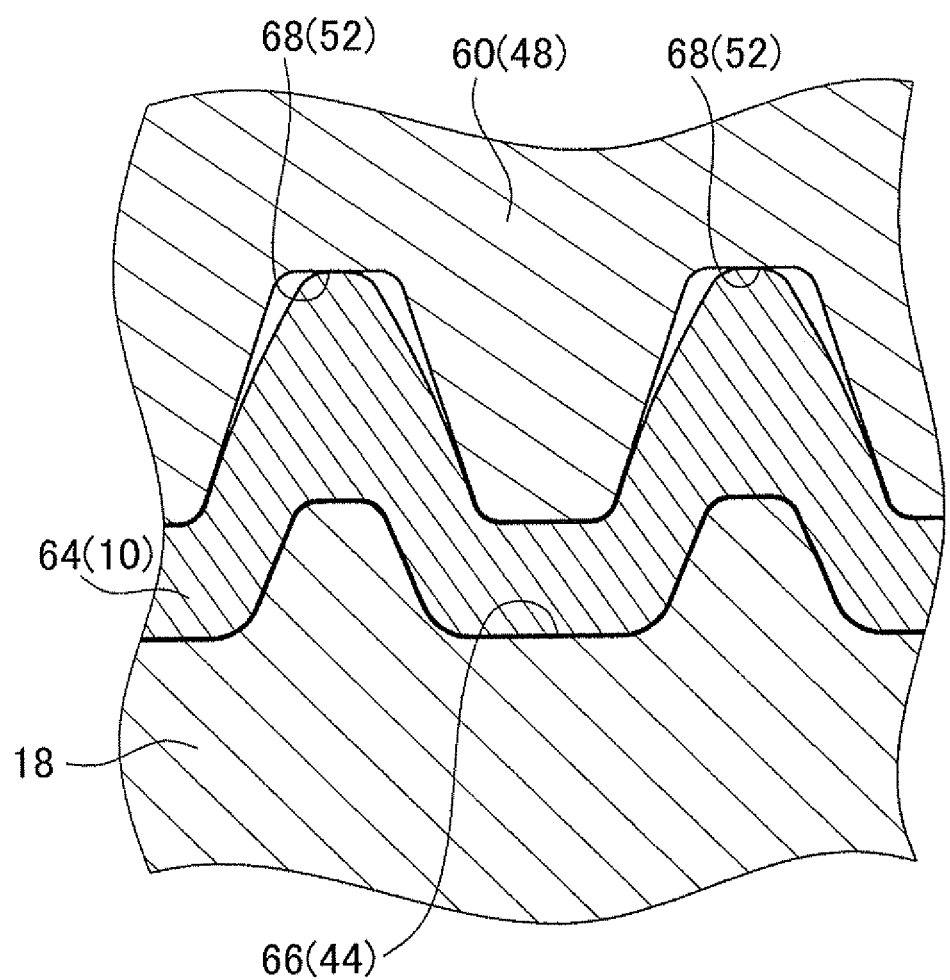
FIG. 24 is a cross-sectional view showing a main portion of the third restraint punch, the workpiece, and the compression die at the time when the compression process has further progressed according to the first embodiment.

After that, as the compression process progresses, the height of the preliminary side wall portion 64 further reduces as shown in FIG. 23. Then, at the same time, the preliminary side wall portion 64 expands toward the tooth root portion 66 of the third restraint punch 18 and the tooth root portion 68 of the compression die 22 as shown in FIG. 24, which further increases the thickness of the preliminary side wall portion 64. Then, a portion of the preliminary side wall portion 64 around its center portion in the axial direction (in the up-down direction of FIG. 23) contacts the compression die 22.

Figure 25:
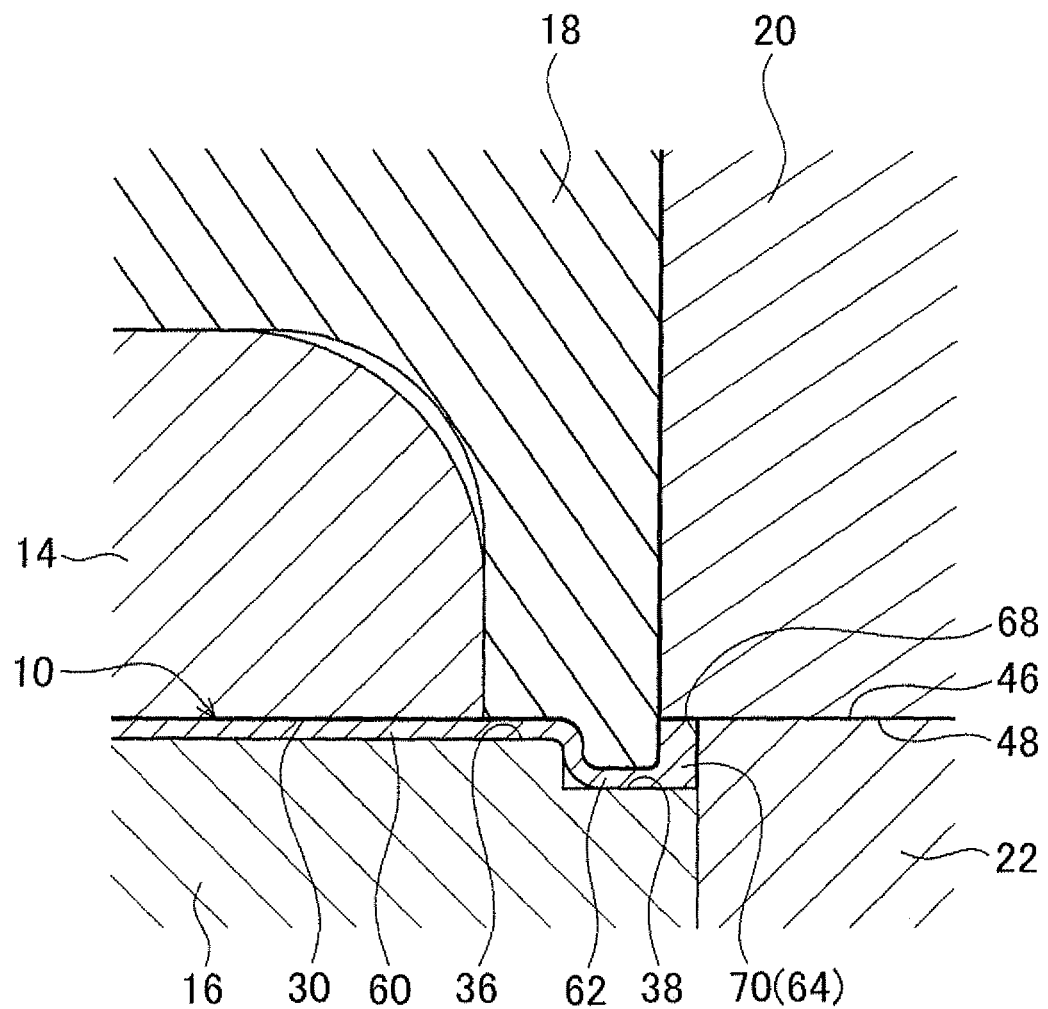
FIG. 25 is an enlarged sectional view showing the vicinity of the outer circumferential portion of the workpiece at the time when the compression process is finished according to the first embodiment.
Figure 26:
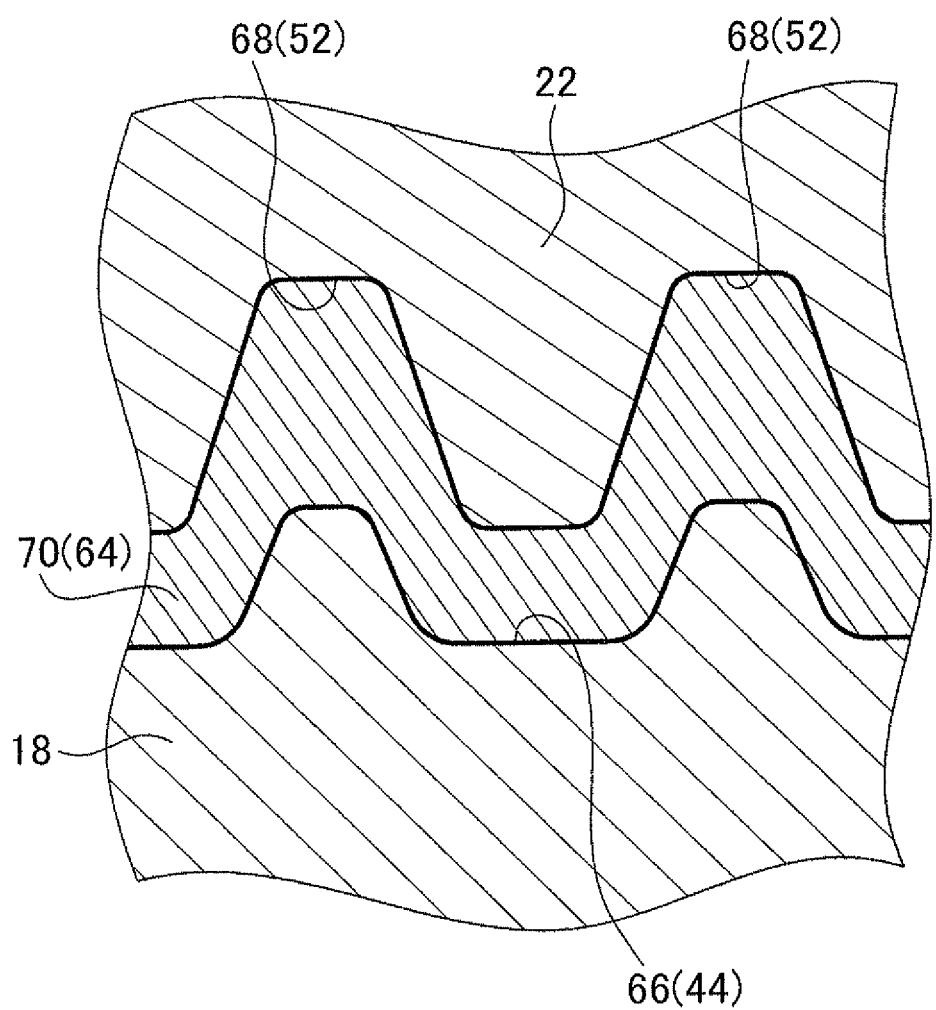
FIG. 26 is a cross-sectional view showing a main portion of the third restraint punch, the workpiece, and the compression die at the time when the compression process is finished according to the first embodiment.

After that, as the compression process progresses, the compression die 22 is further pushed by the compression punch 20 to be moved, and thus the material of the preliminary side wall portion 64 is dragged in the moving direction of the compression die 22 by the frictional resistance between the preliminary side wall portion 64 and the inner peripheral surface 52 of the compression die 22. Then, when the compression process is finished, the height of the preliminary side wall portion 64 is further reduced to form the side wall portion 70 as shown in FIG. 25. At this time, the material of the side wall portion 70 fills the space between the tooth root portion 66 of the third restraint punch 18 and the tooth root portion 68 of the compression die 22 as shown in FIG. 26, thereby forming the side wall portion 70 in a thickened toothed shape.

Figure 27:
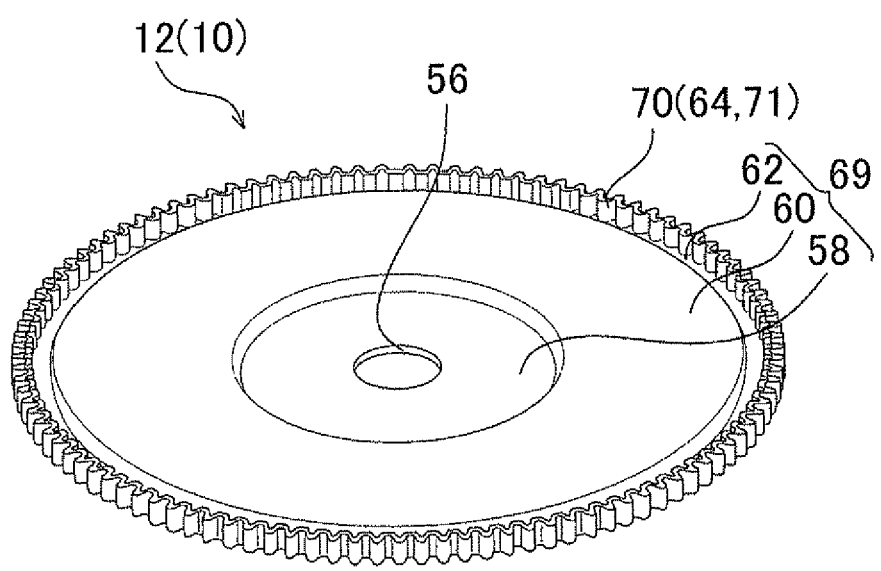
FIG. 27 is a perspective view showing the appearance of the drive plate according to the first embodiment.

By performing the compression process as described above, the drive plate 12 having the side wall portion 70 formed with a toothed shape thickened compared to the inner bottom surface portion 58, the intermediate bottom surface portion 60, and the outer bottom surface portion 62 as shown in FIG. 27 is formed. In the drive plate 12, the inner bottom surface portion 58, the intermediate bottom surface portion 60, and the outer bottom surface portion 62 serves as a plate portion 69 that transfers a drive force of a crankshaft of an engine to a torque converter of a transmission, and the side wall portion 70 serves as the ring gear portion 71 to be meshed with the gear of the starter motor.

In the embodiment, in this way, the preliminary side wall portion 64 of the workpiece 10 is compressed by the compression punch 20 while moving the compression punch 20 and the compression die 22 together. Therefore, the preliminary side wall portion 64 is bulged to tightly contact the compression die 22 as shown in FIGS. 23 and 24, and thereafter the material of the preliminary side wall portion 64 is dragged in the moving direction of the compression die 22 by the frictional resistance between the preliminary side wall portion 64 and the compression die 22. Thus, the pressure acting on a portion of the preliminary side wall portion 64 on the side of the second restraint punch 16 becomes higher. Hence, well-tensioned teeth can be obtained on a surface of the side wall portion 70, which is formed by thickening the preliminary side wall portion 64, on the side of the second restraint punch 16 (a surface of the side wall portion 70 on the leading side in the moving direction of the compression punch 20). The surface of the side wall portion 70 on the side of the second restraint punch 16 serves as a surface on the side into which the gear of the starter motor enters when the ring gear portion 71 of the drive plate 12 is meshed with the gear of the starter motor.

Figure 28:
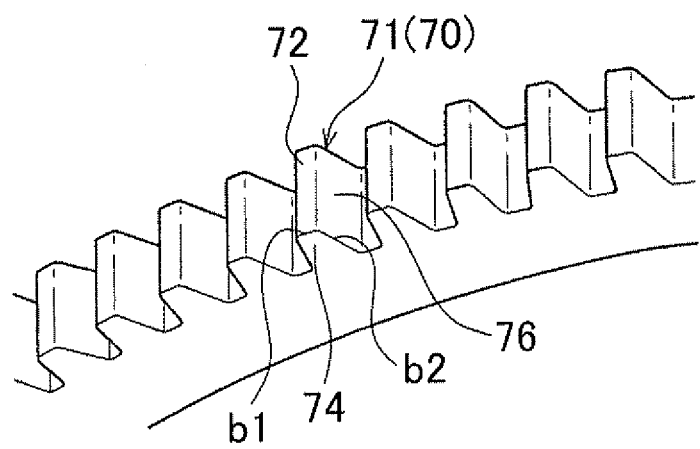
FIG. 28 is an enlarged view showing a toothed portion of a side wall portion.

Here, the phrase "well-tensioned teeth can be obtained" means that the corner portion of the toothed portion can be formed to be tensioned with no underfill portion provided at the corner portion of the toothed portion. In further detail, the phrase "well-tensioned teeth can be obtained" means that a boundary portion b1 between a tooth tip surface 72 and a side surface 74 (a surface on the side of the second restraint punch 16) and a boundary portion b2 between a tooth surface 76 and the side surface 74 at the toothed portion of the ring gear portion 71 (side wall portion 70) shown in FIG. 28 can be well-tensioned. Here, FIG. 28 shows the drive plate 12 shown in FIG. 27 as seen from the lower direction of FIG. 27. An additional process in which the boundary portion b1 and the boundary portion b2 are chamfered may be performed so that the ring gear portion 71 can be meshed with the gear of the starter motor more smoothly.

As described above, the outside diameter (radial dimension of the outside portion) D1 of the compression punch 20 is larger than the radial dimension (root diameter) D2 of the tooth root portion 68 of the toothed shape on the inner peripheral surface 52 of the compression die 22 (see FIGS. 15 and 19). Increasing the outside dimension of the compression punch 20 in this way can thicken the compression punch 20. This increases the strength of the compression punch 20, thereby extending the life of the compression punch 20.

<Releasing Process>

Figure 29:
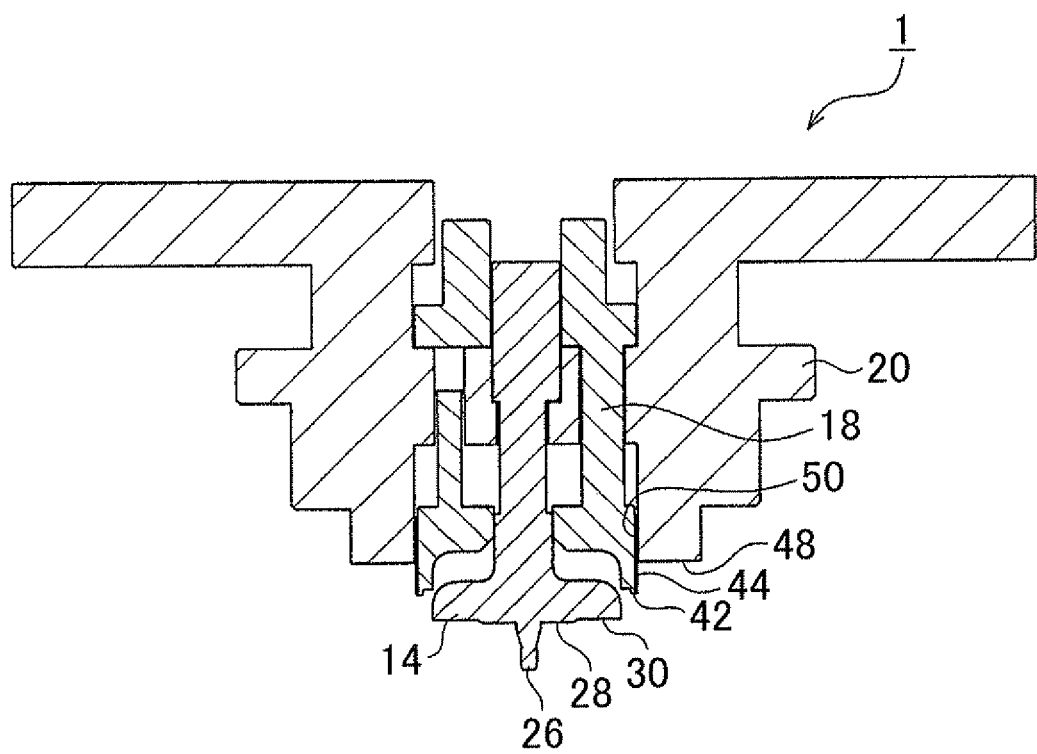
FIG. 29 shows the overall configuration of the manufacturing device for the drive plate in a releasing process.
Figure 29:
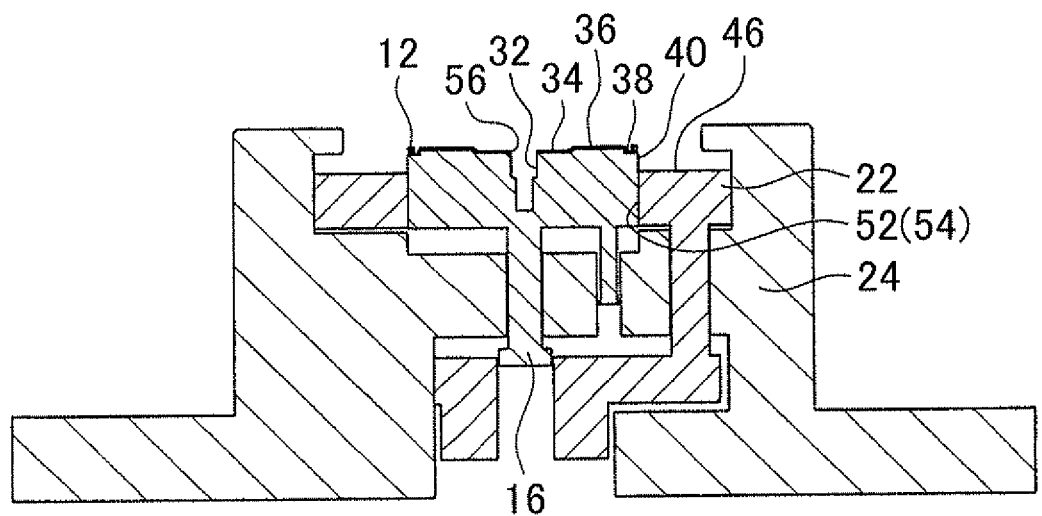

Next, in the releasing process, as shown in FIG. 29, the first restraint punch 14, the second restraint punch 16, the third restraint punch 18, and the compression punch 20 are retracted with respect to the compression die 22 and the stationary die 24, and further the first restraint punch 14, the third restraint punch 18, and the compression punch 20 are retracted with respect to the second restraint punch 16. Then, the drive plate 12 is taken out of the manufacturing device 1.

In this way, the drive plate 12 (see FIG. 27) including the bottom surface portion (the inner bottom surface portion 58, the intermediate bottom surface portion 60, and the outer bottom surface portion 62) and the side wall portion 70 provided to extend vertically upright from an outer peripheral end portion of the outer bottom surface portion 62 of the bottom surface portion can be manufactured from the cup-shaped workpiece 10. Then, the side wall portion 70 serves as the ring gear portion 71, and the drive plate 12 serves as a drive plate shaped integrally with the ring gear portion 71. In the related art, two components, namely a drive plate and a ring gear, are welded to each other to be manufactured. According to the embodiment, however, the drive plate 12 shaped integrally with a ring gear can be manufactured by pressing from the single workpiece 10 in a flat plate shape.

Figure 30:
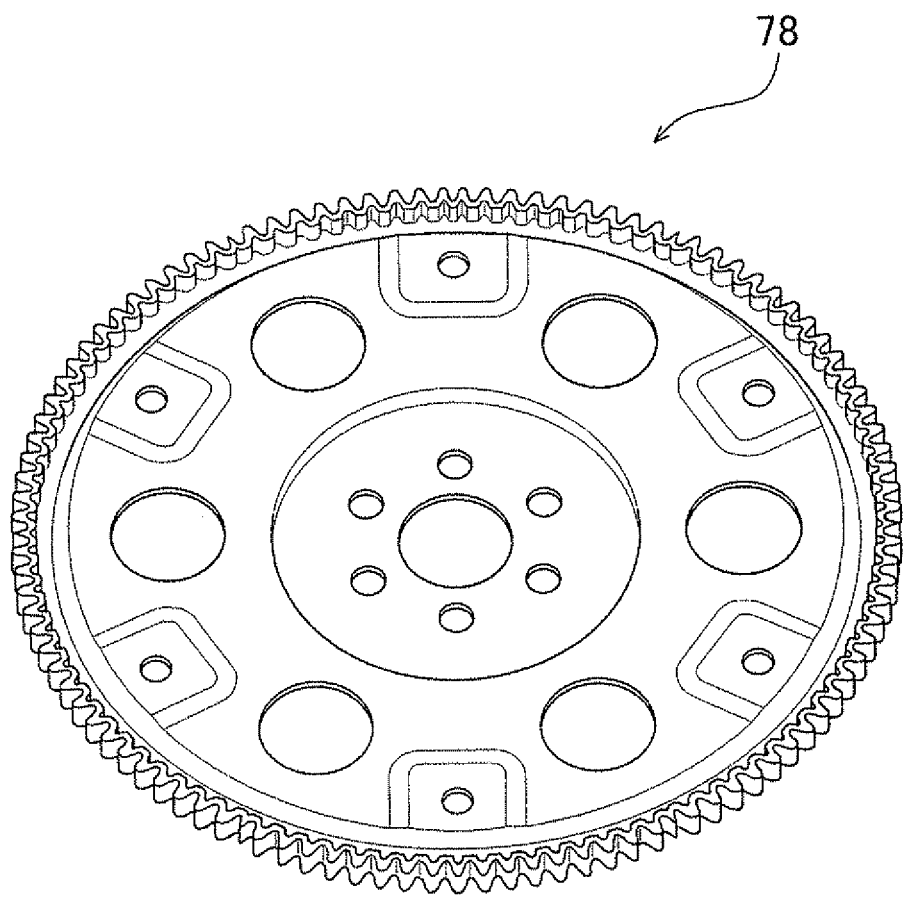
FIG. 30 is a perspective view showing the appearance of the drive plate after additional processes such as a heat treatment and a hole forming process are performed according to the first embodiment.

The drive plate 12 formed as described above may thereafter be further subjected to additional processes such as a heat treatment and a hole forming process to form a drive plate 78 shaped as shown in FIG. 30, for example.

Effects of the Embodiment

In the embodiment, the preliminary side wall portion 64 of the workpiece 10 is compressed by the compression punch 20 while moving the compression punch 20 and the compression die 22 together. Therefore, the preliminary side wall portion 64 is bulged to tightly contact the compression die 22, and thereafter the material of the preliminary side wall portion 64 is dragged in the moving direction of the compression die 22 by the frictional resistance between the preliminary side wall portion 64 and the compression die 22. Thus, the pressure acting on a portion of the preliminary side wall portion 64 on the side of the second restraint punch 16 becomes higher. Hence, well-tensioned teeth can be obtained on a surface of the side wall portion 70, which is formed by thickening the preliminary side wall portion 64, on the side of the second restraint punch 16 (a surface of the side wall portion 70 on the leading side in the moving direction of the compression punch 20).

Then, the side wall portion 70 serves as the ring gear portion 71, and a surface of the side wall portion 70 on the side of the second restraint punch 16 serves as the side surface 74 into which the gear of the starter motor enters when the ring gear portion 71 is meshed with the gear of the starter motor when the drive plate 12 is assembled to an automobile. Therefore, the ring gear portion 71 of the drive plate 12 can be smoothly meshed with the gear of the starter motor since well-tensioned teeth are obtained on the surface of the side wall portion 70 on the side of the second restraint punch 16.

In addition, well-tensioned teeth can be obtained on the surface of the side wall portion 70 on the side of the second restraint punch 16 even if the preliminary side wall portion 64 of the workpiece 10 is not compressed by the compression punch 20 with a large load, and thus an excessive load is not applied to the compression punch 20. This extends the life of the compression punch 20.

In addition, in order to move the compression punch with respect to the stationary compression die on the inner side the inner peripheral surface of the compression die, it is necessary that the compression punch should have a tubular shape (sleeve shape) with a small thickness. In the embodiment, however, the compression punch 20 and the compression die 22 are moved together, and thus the compression punch 20 can have a tubular shape with a large thickness. This increases the strength of the compression punch 20 as a single component, thereby extending the life of the compression punch 20.

In addition, the radial dimension D1 of the outside portion of the compression punch 20 is larger than the radial dimension D2 of the tooth root portion 68 of the toothed shape on the inner peripheral surface 52 of the compression die 22. Increasing the outside dimension of the compression punch 20 in this way can thicken the compression punch 20. This increases the strength of the compression punch 20, thereby extending the life of the compression punch 20 as a single component.

Second Embodiment

Next, a second embodiment will be described. In the following description, constituent elements that are equivalent to those according to the first embodiment are denoted by the same reference numerals so that the same description will not be repeated, and differences will be focused on. In the second embodiment, a round punch is used in the compression process as the third restraint punch 18 in place of the punch with the outer peripheral surface 44 formed in a toothed shape as described above. Here, the round punch is a punch in a circular column shape in which a toothed shape is formed in no part of the entire outer peripheral surface 44. That is, the round punch is a punch in which the outer peripheral surface 44 is smooth and has generally the same diameter over the entire periphery. In addition, a punch in which the inner peripheral surface 50 is smooth and has generally the same diameter over the entire periphery, that is, a punch in which a toothed portion is formed in no part of the entire inner peripheral surface 50, is used as the compression punch 20.

Figure 31:
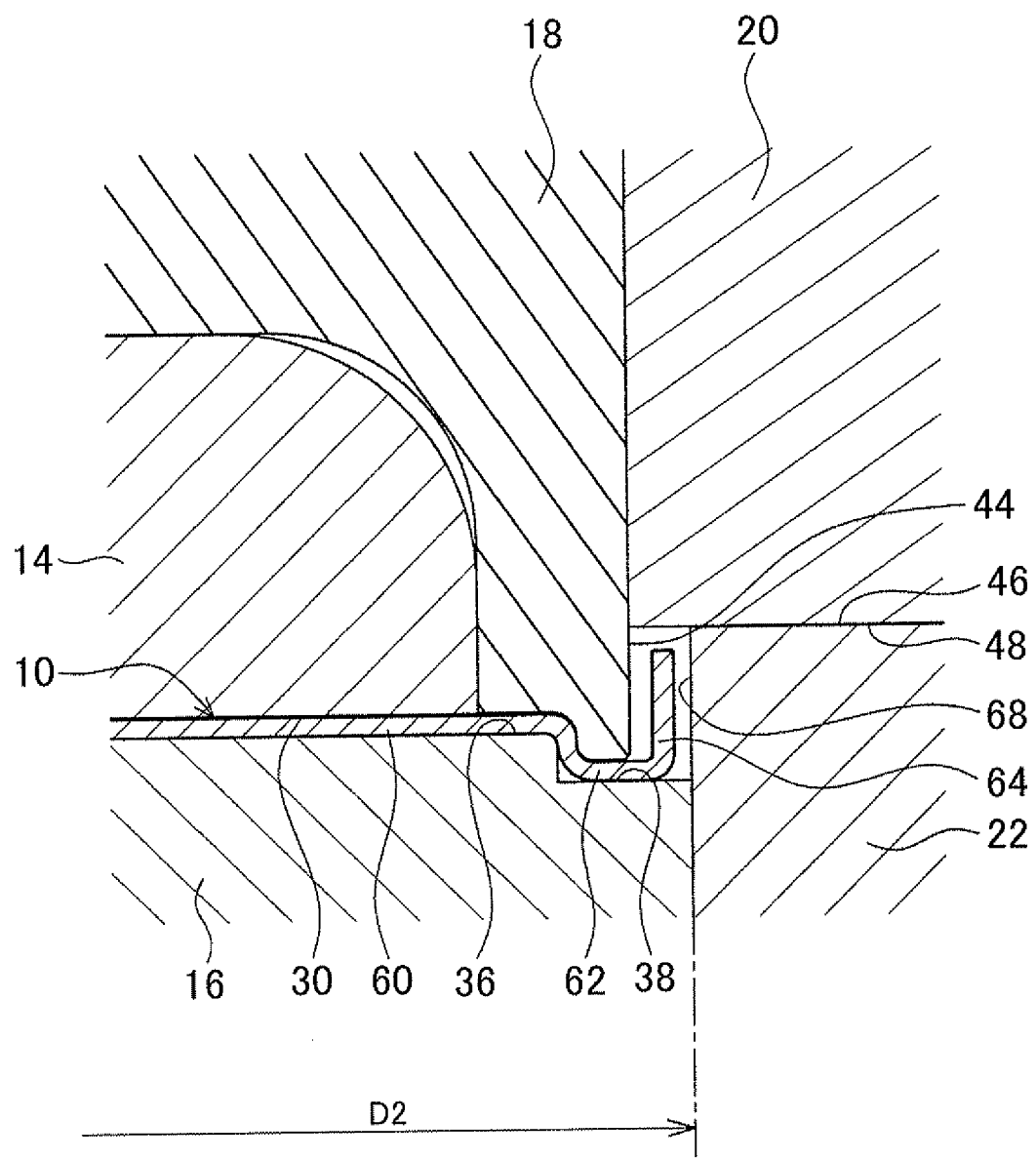
FIG. 31 is an enlarged sectional view showing the vicinity of the outer circumferential portion of a workpiece at the time when a compression punch contacts a compression die according to a second embodiment.
Figure 32:
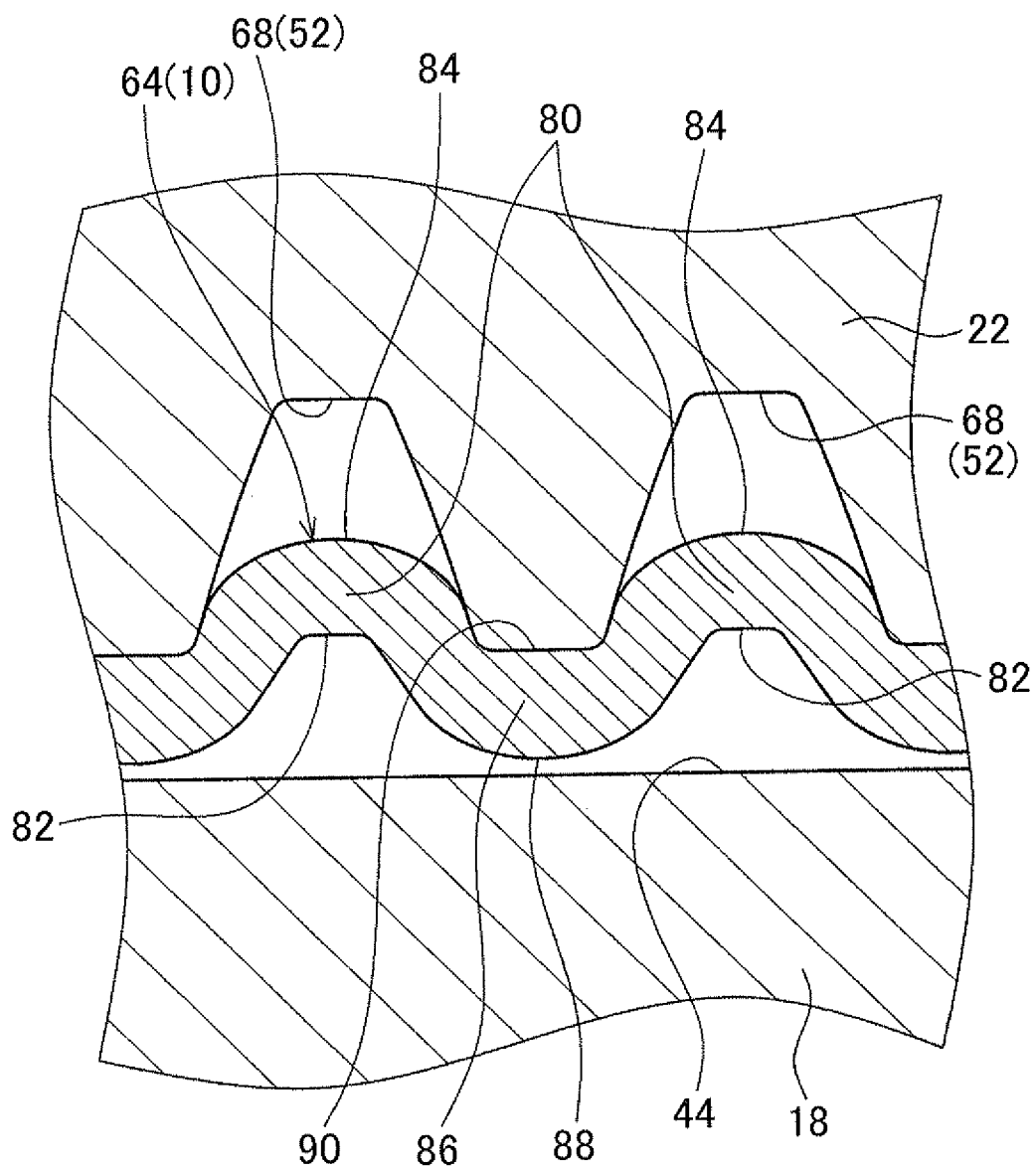
FIG. 32 is a cross-sectional view showing a main portion of a third restraint punch, the workpiece, and the compression die at the time when the compression punch contacts the compression die according to the second embodiment.

If the round punch is used as the third restraint punch 18 in this way, thickened tooth shaping is performed in the compression process as follows. First, when the distal-end surface 48 of the compression punch 20 contacts the surface 46 of the compression die 22, an enlarged cross-sectional view showing the vicinity of the outer circumferential portion of the workpiece 10 is as shown in FIG. 31. In addition, a cross-sectional view showing a main portion of the third restraint punch 18, the workpiece 10, and the compression die 22 is as shown in FIG. 32. At this time, as shown in FIGS. 31 and 32, none of a radially inner portion 82 and a radially outer portion 84 of a large-diameter portion 80 of the preliminary side wall portion 64 of the workpiece 10 are restrained. That is, the large-diameter portion 80 of the preliminary side wall portion 64 of the workpiece 10 is spaced (released) from the tooth root portion 68 of the inner peripheral surface 52 of the compression die 22 and the outer peripheral surface 44 of the third restraint punch 18.

Figure 33:
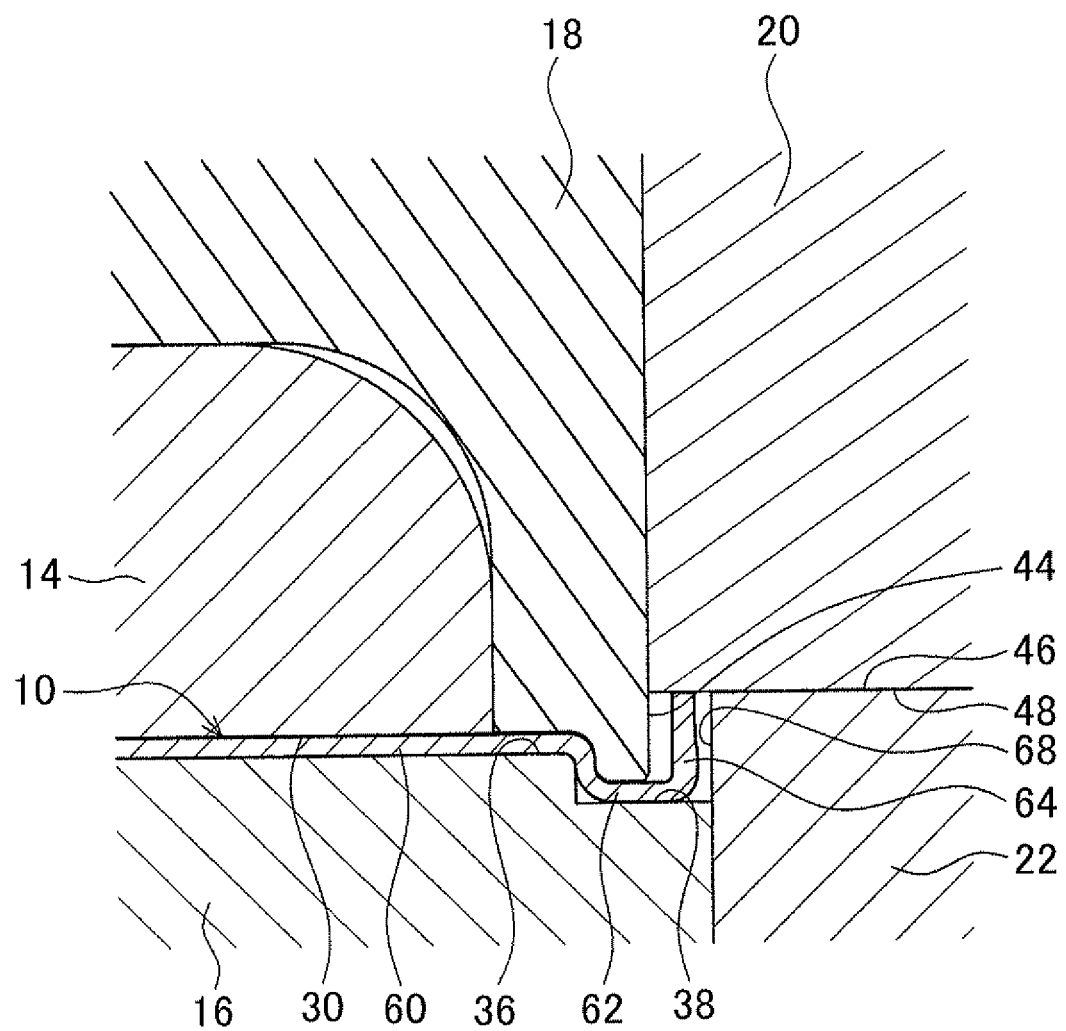
FIG. 33 is an enlarged sectional view showing the vicinity of the outer circumferential portion of the workpiece at the time when the compression punch starts compressing a preliminary side wall portion according to the second embodiment.
Figure 34:
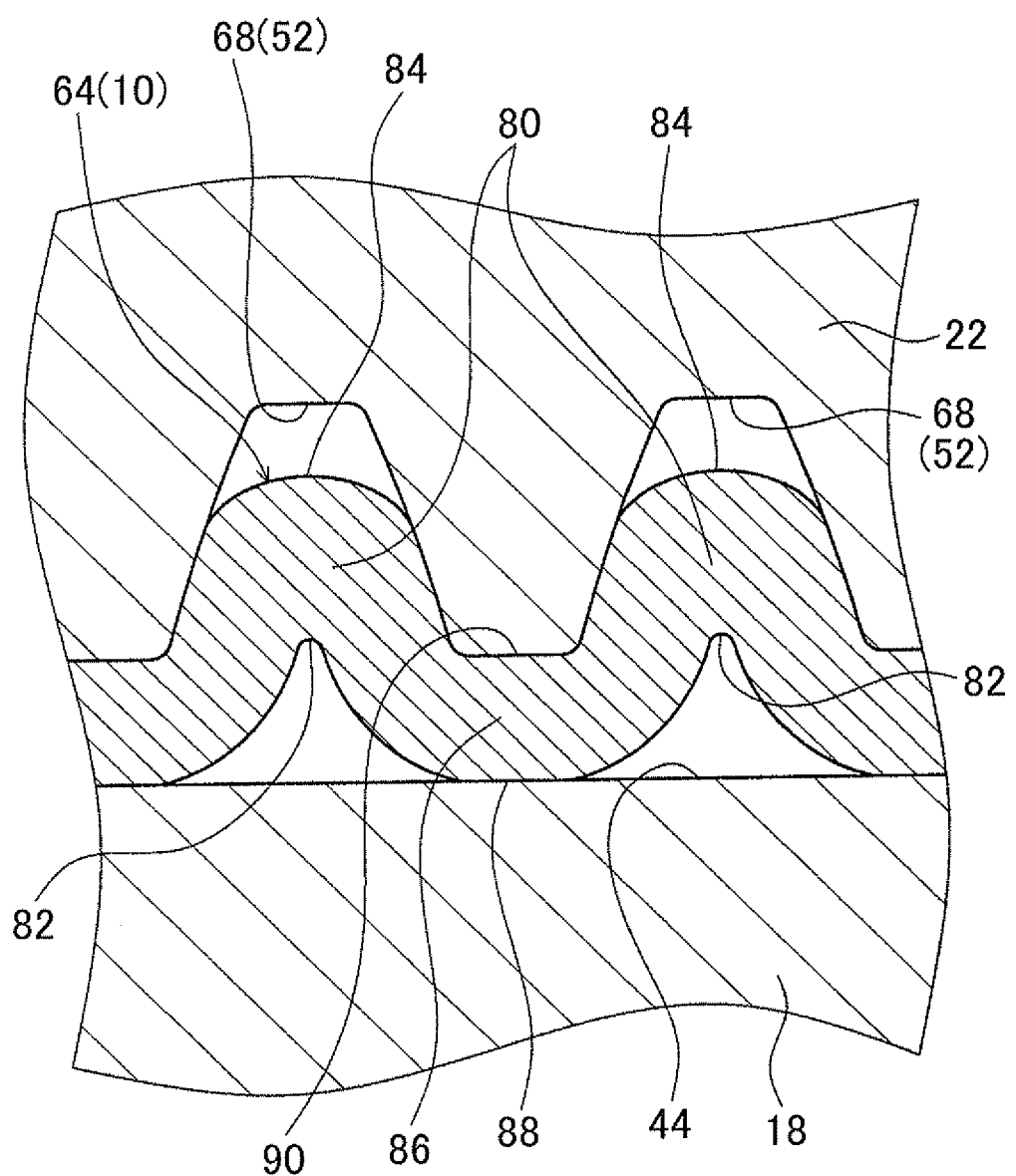
FIG. 34 is a cross-sectional view showing a main portion of the third restraint punch, the workpiece, and the compression die at the time when the compression punch starts compressing the preliminary side wall portion according to the second embodiment.

Then, after the distal-end surface 48 of the compression punch 20 contacts the surface 46 of the compression die 22, the compression die 22 is pushed by the compression punch 20 to be moved, and the compression punch 20 starts compressing the preliminary side wall portion 64 with the distal-end surface 48 of the compression punch 20 in contact with the distal-end surface of the preliminary side wall portion 64. Now, the height of the preliminary side wall portion 64 starts reducing as shown in FIG. 33. Then, at the same time, the preliminary side wall portion 64 starts expanding toward the outer peripheral surface 44 of the third restraint punch 18 and the tooth root portion 68 of the compression die 22 as shown in FIG. 34, which causes the thickness of the preliminary side wall portion 64 to start increasing. At this time, as described above, none of the radially inner portion 82 and the radially outer portion 84 of the large-diameter portion 80 of the preliminary side wall portion 64 are restrained. That is, the large-diameter portion 80 is spaced from the tooth root portion 68 of the compression die 22 and the outer peripheral surface 44 of the third restraint punch 18. Both of a radially inner portion 88 and a radially outer portion 90 of a small-diameter portion 86 of the preliminary side wall portion 64 of the workpiece 10 are restrained.

Figure 35:
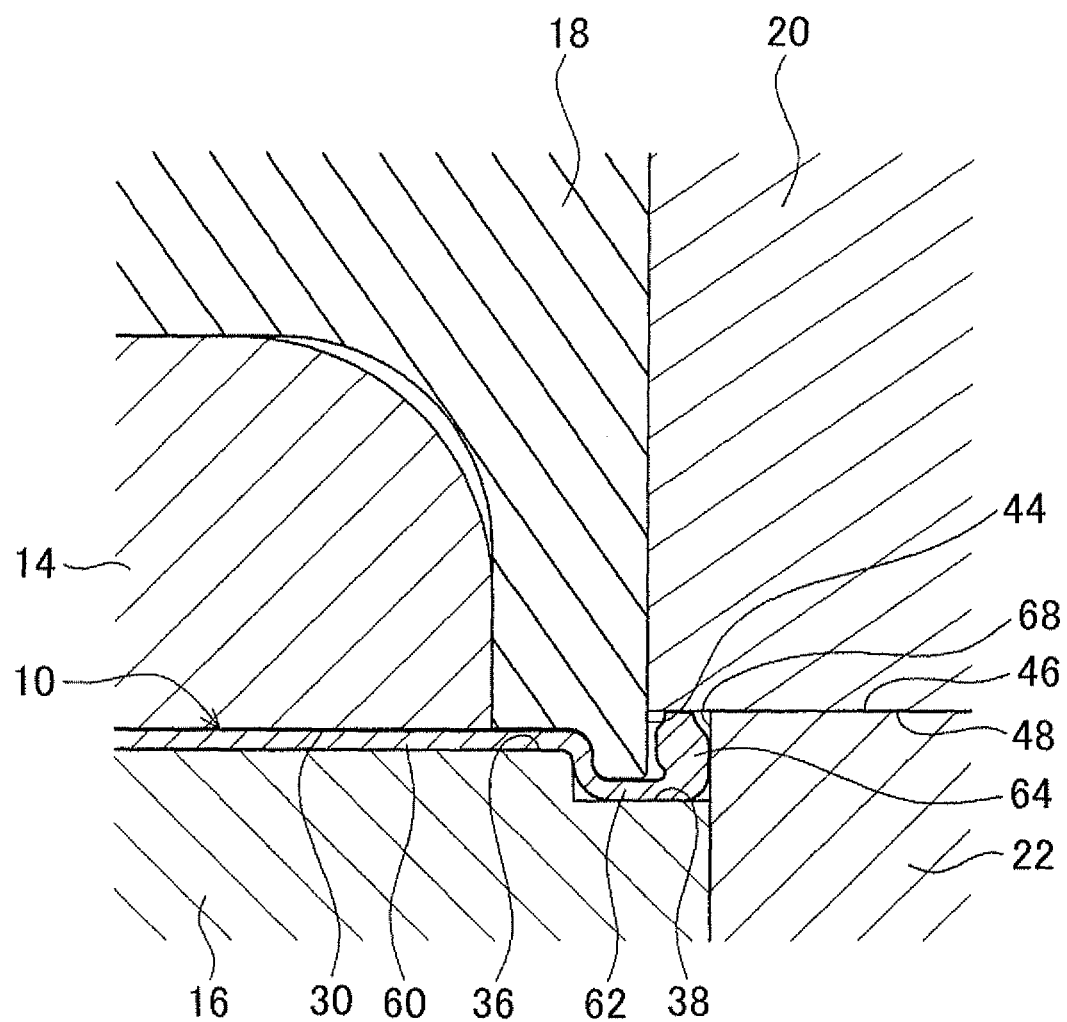
FIG. 35 is an enlarged sectional view showing the vicinity of the outer circumferential portion of the workpiece at the time when the compression process has further progressed according to the second embodiment.
Figure 36:
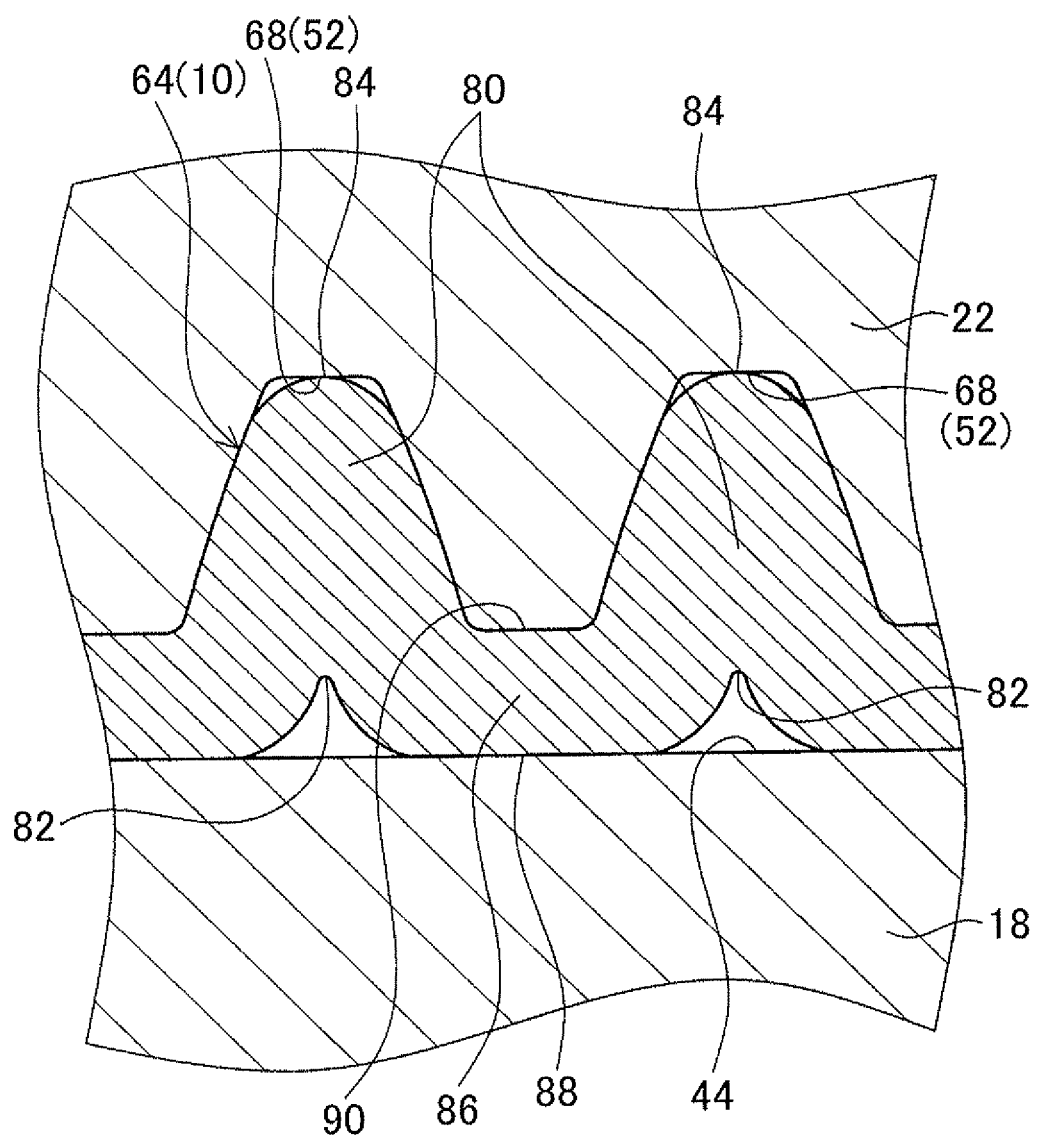
FIG. 36 is a cross-sectional view showing a main portion of the third restraint punch, the workpiece, and the compression die at the time when the compression process has further progressed according to the second embodiment.

After that, as the compression process progresses, the height of the preliminary side wall portion 64 further reduces as shown in FIG. 35. Then, at the same time, the preliminary side wall portion 64 expands toward the outer peripheral surface 44 of the third restraint punch 18 and the tooth root portion 68 of the compression die 22 as shown in FIG. 36, which further increases the thickness of the preliminary side wall portion 64. Then, a portion of the preliminary side wall portion 64 around its center portion in the axial direction (in the up-down direction of FIG. 35) contacts the compression die 22.

Figure 37:
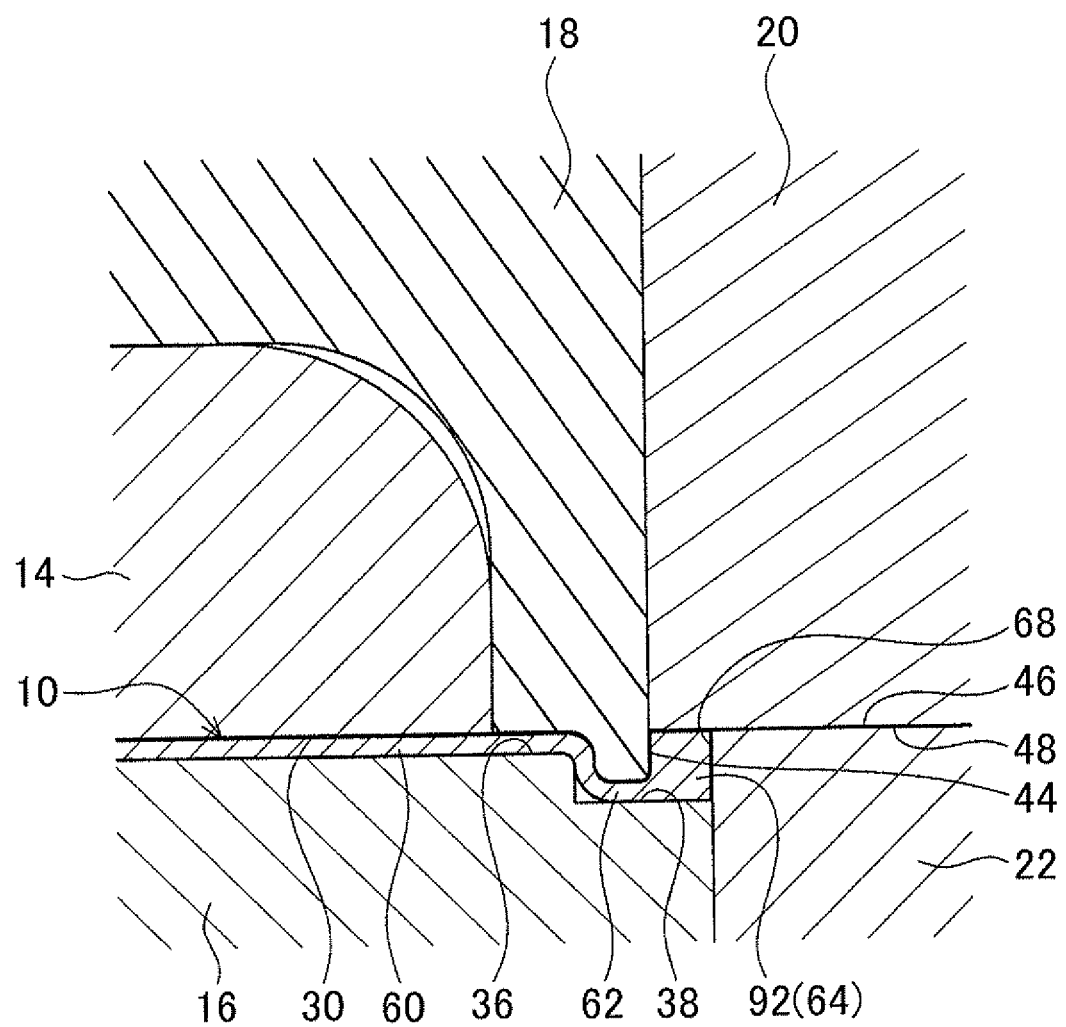
FIG. 37 is an enlarged sectional view showing the vicinity of the outer circumferential portion of the workpiece at the time when the compression process is finished according to the second embodiment.
Figure 38:
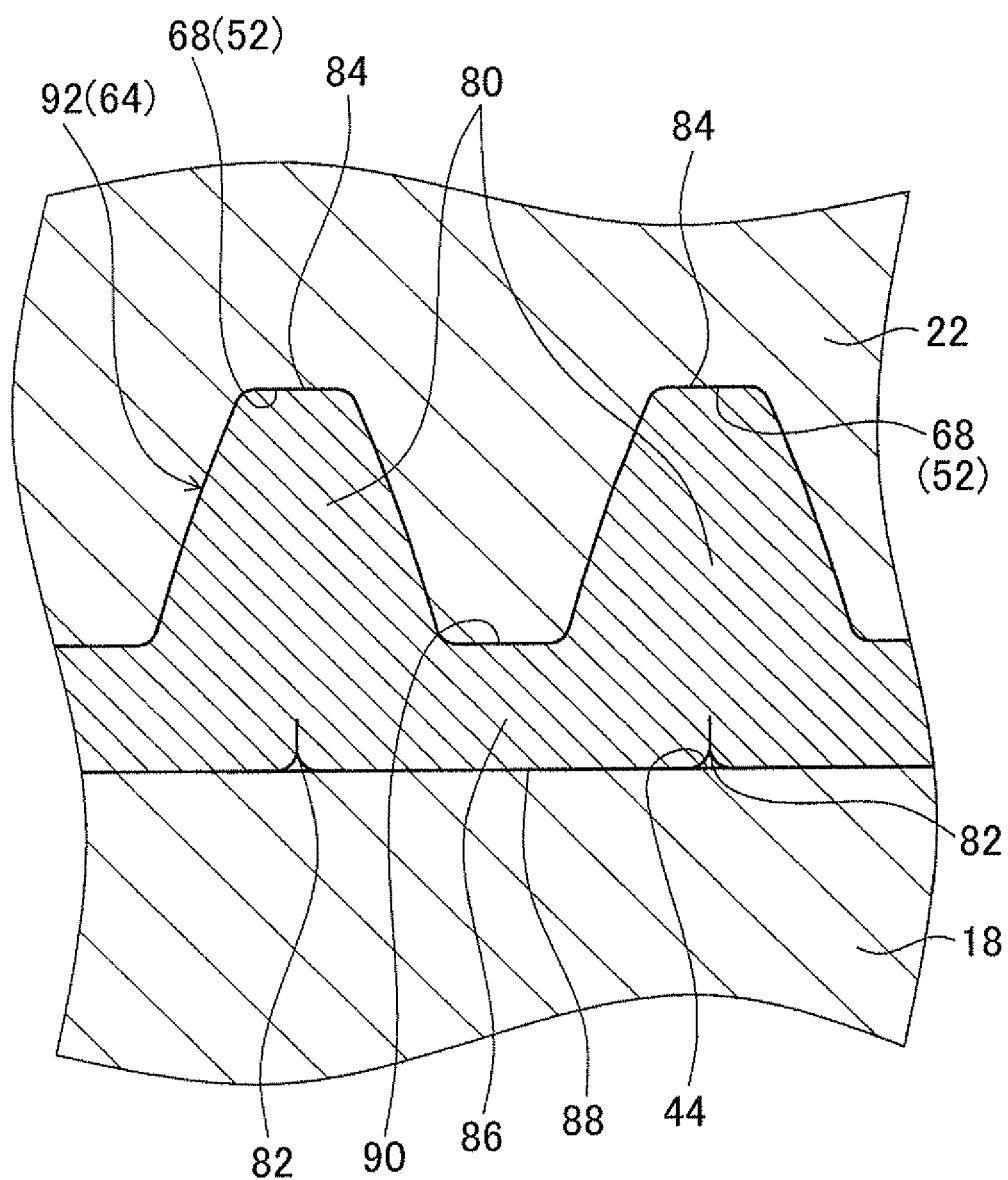
FIG. 38 is a cross-sectional view showing a main portion of the third restraint punch, the workpiece, and the compression die at the time when the compression process is finished according to the second embodiment.

Thereafter, as the compression process progresses, the preliminary side wall portion 64 expands toward the outer peripheral surface 44 of the third restraint punch 18 and the tooth root portion 68 of the compression die 22 as shown in FIG. 36, which further increases the thickness of the preliminary side wall portion 64. In addition, the compression die 22 is further pushed by the compression punch 20 to be moved, and thus the material of the preliminary side wall portion 64 is dragged in the moving direction of the compression die 22 by the frictional resistance between the preliminary side wall portion 64 and the inner peripheral surface 52 of the compression die 22. Then, when the compression process is finished, the height of the preliminary side wall portion 64 is further reduced to form a side wall portion 92 as shown in FIG. 37. At this time, the material of the side wall portion 92 fills the space between the outer peripheral surface 44 of the third restraint punch 18 and the tooth root portion 68 of the compression die 22 as shown in FIG. 38, thereby forming the side wall portion 92 in a thickened toothed shape.

Figure 39:
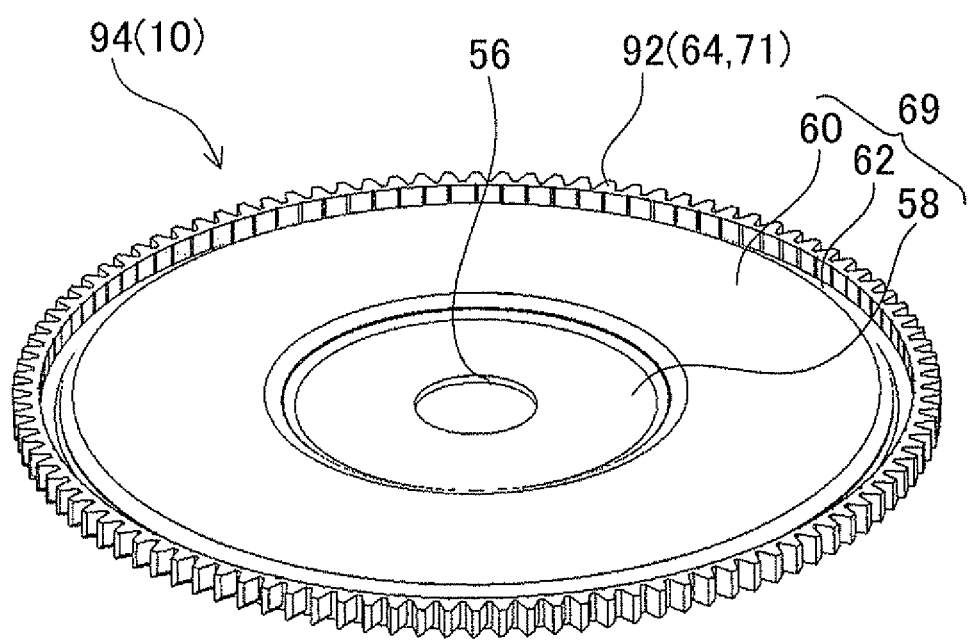
FIG. 39 is a perspective view showing the appearance of the drive plate according to the second embodiment.

By performing the compression process as described above, a drive plate 94 having the side wall portion 92 formed with a toothed shape thickened compared to the inner bottom surface portion 58, the intermediate bottom surface portion 60, and the outer bottom surface portion 62 as shown in FIG. 39 is formed. In particular, the thus formed side wall portion 92 has a thickness larger than that of the side wall portion 70 (see FIG. 27) according to the first embodiment. Therefore, the drive plate 94 has improved strength compared to the drive plate 12 (see FIG. 27) according to the first embodiment.

Figure 40:
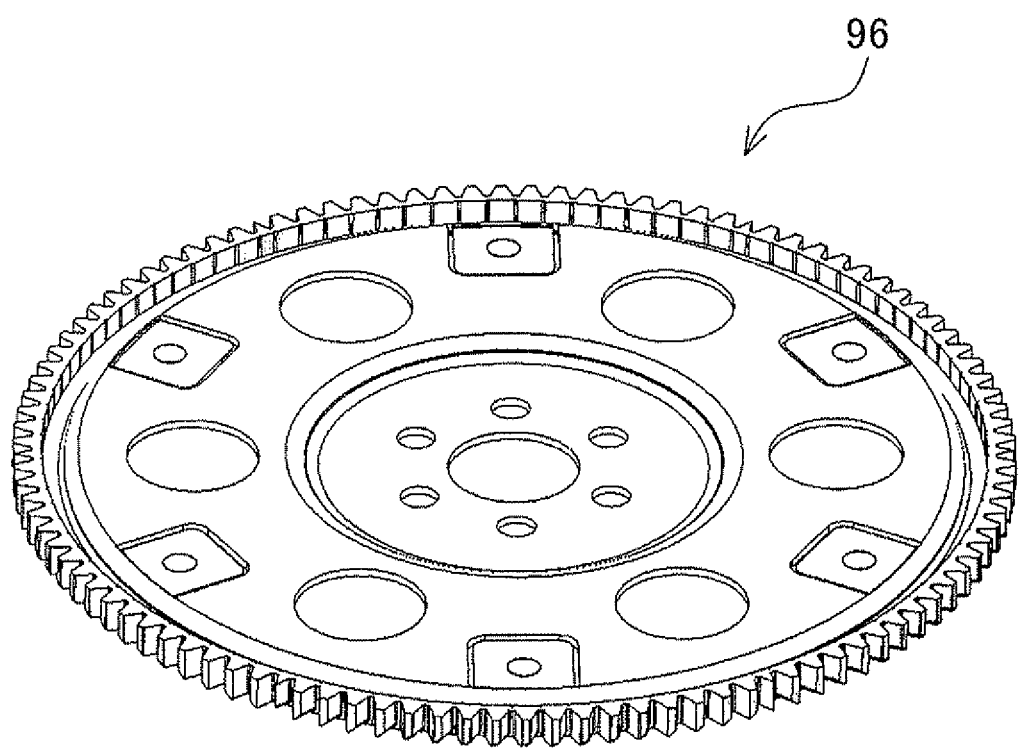
FIG. 40 is a perspective view showing the appearance of the drive plate after additional processes such as a heat treatment and a hole forming process are performed according to the second embodiment.

The drive plate 94 formed as described above may thereafter be further subjected to additional processes such as a heat treatment and a hole forming process to form a drive plate 96 shaped as shown in FIG. 40, for example.

In addition, the strength of the third restraint punch 18 is improved by using the round punch in a circular column shape, in which a toothed shape is formed in no part of the entire outer peripheral surface 44, as the third restraint punch 18. This extends the life of the third restraint punch 18. This also allows manufacture of the drive plate 94 with a large tooth depth. Further, the round punch can be manufactured inexpensively, thereby reducing the manufacturing cost of the third restraint punch 18.

According to the embodiment described above, the following effects can be obtained in addition to the effects of the first embodiment described above. In the embodiment, the third restraint punch 18 is provided to restrain the intermediate bottom surface portion 60 and the outer bottom surface portion 62 of the workpiece 10 from the side in which the preliminary side wall portion 64 extends upright in the axial direction at a location on the inner side of the preliminary side wall portion 64 of the cup-shaped workpiece 10. In addition, the preliminary side wall portion 64 of the workpiece 10 has been formed with a toothed shape in advance so as to include the small-diameter portion 86 formed on the inner side in the radial direction and the large-diameter portion 80 formed on the outer side in the radial direction with respect to the small-diameter portion 86. Then, when the compression punch 20 starts compressing the preliminary side wall portion 64 of the workpiece 10 in the axial direction, the large-diameter portion 80 of the preliminary side wall portion 64 of the workpiece 10 is spaced from the tooth root portion 68 of the inner peripheral surface 52 of the compression die 22 and the outer peripheral surface 44 of the third restraint punch 18.

In this way, when the compression punch 20 starts compressing the preliminary side wall portion 64 of the workpiece 10 in the axial direction, the radially inner portion 82 and the radially outer portion 84 of the large-diameter portion 80 of the preliminary side wall portion 64 of the workpiece 10 are not restrained. Consequently, as the compression punch 20 compresses the preliminary side wall portion 64 of the workpiece 10 in the axial direction, the material of the preliminary side wall portion 64 of the workpiece 10 flows radially inward and radially outward. Therefore, the thickness of the ring gear portion 71 (side wall portion 92) of the drive plate 94 can be increased. This improves the strength of the drive plate 94.

The outer peripheral surface 44 of the third restraint punch 18 is a smooth surface having generally the same diameter over the entire periphery. Therefore, the strength of the third restraint punch 18 is improved compared to a case where the third restraint punch 18 is a punch in which a toothed shape is formed on the outer peripheral surface 44. This extends the life of the third restraint punch 18. In addition, the round punch can be manufactured inexpensively, thereby reducing the cost of the third restraint punch 18.

The embodiments described above are merely illustrative, and do not limit the present invention in any way. It is a matter of course that various improvements and modifications may be made without departing from the scope and spirit of the present invention.

The invention claimed is:

1. A manufacturing device for a drive plate that manufactures a drive plate including (i) a plate portion that transfers a drive force and (ii) a ring gear portion provided at an outer periphery of the plate portion, the manufacturing device comprising:

a compression punch that compresses a side wall portion of a raw material in an axial direction, the raw material including a bottom surface portion and the side wall portion which is cylindrical and provided to extend upright from an outer peripheral end portion of the bottom surface portion;

a compression die disposed to face the compression punch in the axial direction and having a toothed shape formed on an inner peripheral surface of the compression die; and a die that restrains the bottom surface portion, wherein when the compression punch compresses the side wall portion, which is disposed inward of the inner peripheral surface of the compression die, in the axial direction, the compression punch presses the raw material against the compression die, and thereafter the compression die is pushed by the compression punch to form a toothed shape on the side wall portion while both the compression die and the compression punch are relatively moving in the axial direction with respect to the die that restrains the bottom surface portion to form the ring gear portion.

2. The manufacturing device for a drive plate according to claim 1, wherein an outside diameter of the compression punch is larger than a root diameter of the toothed shape formed on the inner peripheral surface of the compression die.

3. The manufacturing device for a drive plate according to claim 1, further comprising:

a restraint punch that restrains the bottom surface portion of the raw material from a side in which the side wall portion extends upright in the axial direction at a location inward of the side wall portion, wherein:

the side wall portion has been formed with a toothed shape in advance so as to include a small-diameter portion formed on an inner side in a radial direction and a large-diameter portion formed on an outer side in the radial direction with respect to the small-diameter portion; and the large-diameter portion of the side wall portion is spaced from an outer peripheral surface of the restraint punch when the compression punch starts compressing the side wall portion in the axial direction.

4. The manufacturing device for a drive plate according to claim 2, further comprising:

a restraint punch that restrains the bottom surface portion of the raw material from a side in which the side wall portion extends upright in the axial direction at a location inward of the side wall portion, wherein:

the side wall portion has been formed with a toothed shape in advance so as to include a small-diameter portion formed on an inner side in a radial direction and a large-diameter portion formed on an outer side in the radial direction with respect to the small-diameter portion; and the large-diameter portion of the side wall portion is spaced from an outer peripheral surface of the restraint punch when the compression punch starts compressing the side wall portion in the axial direction.

5. The manufacturing device for a drive plate according to claim 3, wherein the outer peripheral surface of the restraint punch is a smooth surface having generally the same diameter over the entire periphery.

6. The manufacturing device for a drive plate according to claim 4, wherein the outer peripheral surface of the restraint punch is a smooth surface having generally the same diameter over the entire periphery.

7. A manufacturing method for a drive plate for manufacturing a drive plate including (i) a plate portion that transfers a drive force and (ii) a ring gear portion provided at an outer periphery of the plate portion, the manufacturing method comprising:

a compression process in which a compression punch configured to compress a side wall portion of a raw material in an axial direction compresses the side wall portion of the raw material in the axial direction, the raw material including a bottom surface portion and the side wall portion which is cylindrical and provided to extend upright from an outer peripheral end portion of the bottom surface portion, wherein in the compression process, the side wall portion is disposed on an inner side of an inner peripheral surface of a compression die disposed to face the compression punch in the axial direction and having a toothed shape formed on the inner peripheral surface, the compression punch presses the raw material against the compression die, and thereafter the compression die is pushed by the compression punch to form a toothed shape on the side wall portion while both the compression die and the compression punch are relatively moving in the axial direction with respect to the die that restrains the bottom surface portion to form the ring gear portion.

8. The manufacturing method according to claim 7, wherein the ring gear portion is shaped to be meshed with a gear of a starter motor.

9. The manufacturing device for a drive plate according to claim 1, wherein the compression punch and the die that restrains the bottom surface portion are shaped such that the ring gear portion becomes shaped to be meshed with a gear of a starter motor.

* * * * *